United States Patent

Kaneda

[11] Patent Number: 6,072,525
[45] Date of Patent: *Jun. 6, 2000

[54] IMAGE PICKUP APPARATUS EFFECTING OBJECT IMAGE TRACKING RESPONSIVELY TO OBJECT IMAGE FRAME MOVEMENT AND OBJECT IMAGE MOVEMENT

[75] Inventor: Naoya Kaneda, Chigasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/960,169

[22] Filed: Oct. 29, 1997

Related U.S. Application Data

[63] Continuation of application No. 08/501,992, Jul. 13, 1995.

[30] Foreign Application Priority Data

Jul. 18, 1994 [JP] Japan ................................ 6-187795

[51] Int. Cl.⁷ .......................... H04N 5/225; H04N 5/228; H04N 5/232
[52] U.S. Cl. ..................... 348/208; 348/169; 348/347; 348/352; 348/374; 396/51; 396/55
[58] Field of Search ............... 348/142, 154, 348/155, 207, 208, 169, 170, 333, 334, 345–347, 349–357, 358, 362–365, 373–374; 396/51, 52, 53, 54, 55; H04N 7/18, 5/228, 5/225, 5/232

[56] References Cited

U.S. PATENT DOCUMENTS

| | | |
|---|---|---|
| 2,959,088 | 11/1960 | Räntsch . |
| 4,872,058 | 10/1989 | Baba et al. .................... 358/227 |
| 4,920,369 | 4/1990 | Kaneda et al. ................. 354/400 |
| 5,005,956 | 4/1991 | Kaneda et al. ................. 350/429 |
| 5,012,270 | 4/1991 | Sekine et al. .................. 354/430 |
| 5,031,049 | 7/1991 | Toyama et al. ................. 358/227 |
| 5,103,305 | 4/1992 | Watanabe ....................... 382/236 |
| 5,107,293 | 4/1992 | Sekine et al. .................. 354/430 |
| 5,170,255 | 12/1992 | Yamada et al. ................ 358/222 |
| 5,355,163 | 10/1994 | Tomitaka ....................... 348/234 |
| 5,459,542 | 10/1995 | Fujiwara et al. ............... 354/202 |
| 5,469,210 | 11/1995 | Noguchi et al. ................ 348/208 |
| 5,479,236 | 12/1995 | Tanaka .......................... 354/430 |
| 5,517,238 | 5/1996 | Hirasawa ....................... 348/208 |
| 5,541,655 | 7/1996 | Kaneda .......................... 348/333 |
| 5,561,498 | 10/1996 | Sekine ............................ 396/53 |
| 5,608,703 | 3/1997 | Washisu ......................... 396/55 |
| 5,734,441 | 3/1998 | Kondo et al. .................. 348/700 |
| 5,745,798 | 4/1998 | Hirasawa ........................ 396/51 |
| 5,805,212 | 9/1998 | Fujiwara ......................... 348/208 |

FOREIGN PATENT DOCUMENTS

| | | | |
|---|---|---|---|
| 1-280709 | 11/1989 | Japan | .................. G02B 7/08 |
| 1-321416 | 12/1989 | Japan | .................. G02B 7/08 |
| 2144509 | 6/1990 | Japan | .................. G02B 7/08 |
| 5304631 | 11/1993 | Japan | .................. G02B 7/08 |

*Primary Examiner*—Wendy Garber
*Assistant Examiner*—Ngoc-Yen Vu
*Attorney, Agent, or Firm*—Robin, Blecker & Daley

[57] ABSTRACT

An image pickup apparatus comprises a movement detector for detecting a movement of an object image frame and outputting movement information, a tracking device for tracking the object image on the basis of the movement information of the object image frame detected by the movement detector, a motion detector for detecting a motion of the object in the object image frame and a controller for changing operating characteristics of the motion detector in correspondence with an operation state of the tracking device.

27 Claims, 20 Drawing Sheets

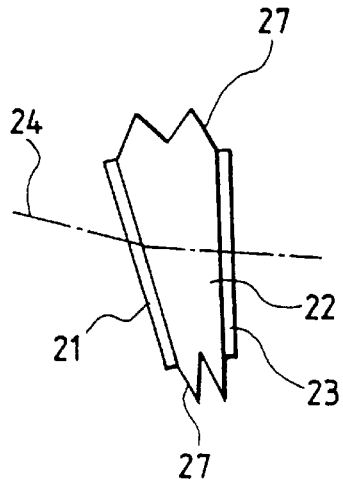
FIG. 1A
(PRIOR ART)
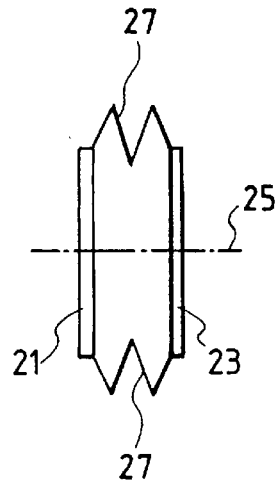
FIG. 1B
(PRIOR ART)
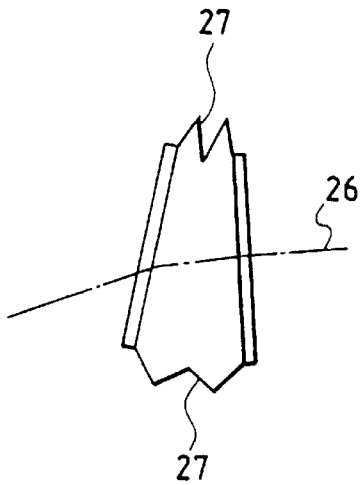
FIG. 1C
(PRIOR ART)
 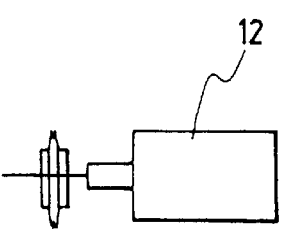
FIG. 2A
(PRIOR ART)
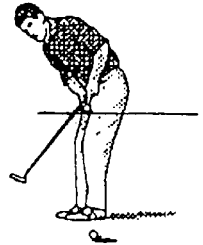 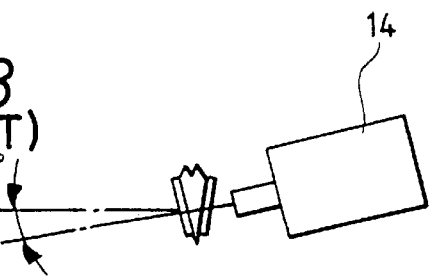
FIG. 2B
(PRIOR ART)

IMAGE PICKUP APPARATUS EFFECTING OBJECT IMAGE TRACKING RESPONSIVELY TO OBJECT IMAGE FRAME MOVEMENT AND OBJECT IMAGE MOVEMENT

This is a continuation application under 37 CFR 1.62 of prior application Ser. No. 08/501,992, filed Jul. 13, 1995.

BACKGROUND OF THE INVENTION

1. Field of the Invention

The present invention relates to an image pickup apparatus such as a still camera, a video camera, or the like and an image pickup method therefor and, more particularly, to an image pickup apparatus which comprises tracking means for holding an object at the center of the frame and recognizing an object position in the frame, and an image pickup method therefor.

2. Related Background Art

In the field of image pickup apparatuses such as video cameras, still cameras, and the like, recently, size and weight reductions that have been made are remarkable, and at the same time, apparatuses tend to have many functions. As one of such functions, a high zoom ratio of a photographing lens is known, and zoom lenses with the zoom ratios of ×10, ×12, and the like are popularly used in home-use cameras.

However, as the zoom ratio of a zoom lens increases, when the focal length at the telephoto focal point side assumes a larger numerical value, even a slight camera shake (or motion) leads to a large change in field angle, and seriously influences an image to be recorded. In an apparatus such as a video camera for performing a dynamic image photographing operation, the object may unnaturally move in the frame. Also, in a still image, a blurred image with a low resolution may be recorded. A still image can be avoided from being blurred to some extent by, e.g., increasing the shutter speed. However, in dynamic image recording, since recording is originally performed in the time base direction, the influence of a motion cannot be eliminated by only setting an appropriate shutter speed. Under these circumstances, a motion prevention apparatus for eliminating the influence of a motion has been put into practical applications mainly in the field of video cameras.

The motion prevention apparatus comprises motion detection means for detecting a motion component, and motion correction means for correcting the motion in correspondence with the detection result of the motion detection means. Of these means, as the motion detection means, a so-called electronic detection method of comparing images of two successive frames, or a method of directly measuring the actual movement of a camera using an angular velocimeter, an angular accelerometer, or the like, is known.

As the motion correction means, a so-called electronic correction method of electronically selecting an actual recording range (clipping range) from an image when an image picked up by image pickup means is read out, or optical motion correction means for optically adjusting the angle of the photographing optical axis in a direction to remove a motion is known.

Of the optical motion correction means, a method using a variable angle prism will be described below with reference to FIGS. 1A to 5. FIGS. 1A to 1C are explanatory views showing a variable angle prism (VAP). Referring to FIGS. 1A to 1C, the variable angle prism is constituted by glass plates 21 and 23, and a bellows portion 27 consisting of, e.g., polyethylene. A transparent liquid such as silicone oil is sealed in the space surrounded by the glass plates and the bellows. In FIG. 1B, the two glass plates 21 and 23 are parallel to each other, and in this case, the incident angle and exit angle of a light ray in the variable angle prism are equal to each other. On the other hand, when the two glass plates form a certain angle, as shown in FIGS. 1A and 1C, a light ray is deflected through a given angle, as indicated by light rays 24 and 26.

Therefore, when a camera is tilted due to, e.g., a motion, the angle of the variable angle prism arranged in front of a lens is controlled to deflect a light ray by an angle corresponding to the tilt angle of the camera, thereby removing the motion.

FIGS. 2A and 2B are explanatory views showing a motion removal state. Assuming that the glass plates of the variable angle prism are parallel to each other, and the photographing optical axis agrees with the center of an object in FIG. 2A, the variable angle prism is driven for a motion of a° to deflect a light ray, as shown in FIG. 2B, so that the photographing optical axis can keep agreeing with the center of the object.

FIG. 3 shows the actual arrangement of a variable angle prism unit which includes a variable angle prism, an actuator for driving the prism, and an angle sensor for detecting the angle of the prism. Since actual motions appear in every directions, each of the front and rear glass surfaces of the variable angle prism is rotatable about rotation axes in two directions having a 90° difference therebetween. In FIG. 3, suffixes a and b indicate components in these two rotation directions, and the components with the corresponding reference numerals have the same functions. Some b-side components are not shown in FIG. 3.

A variable angle prism main body 41 is constituted by glass plates 21 and 23, a bellows portion 27, and an inner liquid. The glass plates 21 and 23 are integrally attached to holding frames 28a and 28b using, e.g., an adhesive. The holding frames 28a and 28b constitute rotation shafts 33a and 33b together with stationary members (not shown), and are rotatable about these shafts. The shafts 33a and 33b have a 90° difference therebetween. A coil 35a is integrally arranged on the holding frames 28a and 28b, and a magnet 36a and yokes 37a and 38a are arranged on a stationary portion (not shown). Therefore, when a current is supplied to the coil 35a, the variable angle prism pivots about the shaft 33a. A slit 29a is formed at the distal end of an arm portion 30a integrally extending from the holding frames 28a and 28b, and constitutes an angle sensor together with a light-emitting element 31a such as an iRED element and a light-receiving element 42a such as a PSD provided to the stationary portion.

FIG. 4 is a block diagram showing a vibration prevention lens system in which a motion prevention apparatus which comprises a variable angle prism as the motion correction means is combined with a lens system. Referring to FIG. 4, the system includes the variable angle prism 41, angle sensors 43 and 44, amplification circuits 53 and 54 for amplifying the outputs from the angle sensors, a microcomputer 45, motion detection units 46 and 47 comprising, e.g., angular accelerometers, actuators 48 and 49 constituted by the above-mentioned members from the coil 35a to the yoke 38a, and a lens 52.

The microcomputer 45 determines currents to be supplied to the actuators 48 and 49 to control the variable angle prism 41 in an angle state optimal for removing a motion in correspondence with the angle states detected by the angle sensors 43 and 44 and the detection results of the motion detection units 46 and 47. Note that the principal components in FIG. 4 constitute two blocks since the control operations in two directions having a 90° difference therebetween are independently performed.

FIG. 5 is a sectional view showing the detailed structure of a conventional variable angle prism. Referring to FIG. 5, the variable angle prism is constituted by glass plates 21 and 23, a liquid 22 sealed inside the prism, a bellows portion 27, and an optical axis 25. The bellows portion 27 is formed by four doughnut-shaped films 59 to 62. The films 59 to 62 are coupled to each other by coupling portions 57, and are coupled to frame members 55 by coupling portions 58. The frame members 55 are paired with frame core members 56.

Of these portions, the coupling portions 57 between the films are formed by welding. For this reason, at least two surface layers of each of the films 59 to 62 preferably consist of a material which can provide a good heat seal, and for example, polyethylene (PE), polypropylene (PP), or the like is normally used.

The frame member 55 and the glass plate 21 or 23 are fixed using an adhesive. When the coupling portion 58 between the frame member 55 and the film 59 or 62 constituting the bellows is formed by welding as in the coupling portion 57, the same material as that of the surface of each film must be used. However, the above-mentioned materials such as PE, PP, and the like which can provide a good heat seal have lower parts precision as compared to, e.g., polycarbonate (PC) which is popularly used for such a lens barrel, and easily deform due to low rigidity. Therefore, the frame core members 56 are arranged to reinforce the frame members 55. Each frame core member 56 consists of a plastic material or a metal such as aluminum, stainless steel, or the like, which has a higher rigidity and higher thermal deformation temperature than those of the material of the frame member 55. The frame member 55 is formed around the frame core member 56 by, e.g., insert molding with reference to the frame core member 56. This structure can assure high flatness of the film welded portion of the frame member 55, high mechanical strength or dimensional precision of the support portion of the glass plate 21 or 23, and high dimensional precision of the fitting diameter of glass.

In the above description, a variable angle prism is used as the optical motion correction means. As another example of the optical motion correction means, a method of movably disposing a correction optical system disclosed in, e.g., U.S. Pat. No. 2,959,088 will be described below. FIG. 6 is a sectional view showing the arrangement of the overall optical system of the optical motion correction means. Referring to FIG. 6, lenses 71 and 72 serve as a correction optical system for main lenses 82 and 83. The focal lengths of the correction optical system are set as follows. Let f1 be the focal length of the lens 71 having negative power, and f2 be the focal length of the lens 72 supported by a movable support portion 73 and having positive power. The focal lengths of the lenses are set to satisfy the relation f1=−f2.

Furthermore, the lens 72 is supported by a gimbals 75 to realize a biaxial movable support mechanism. In order to keep balance with the correction optical system, a counterweight 80 is provided.

When such an optical condition is satisfied, a motion prevention apparatus including so-called inertial pendulum type optical motion correction means can be realized.

The biaxial movable mechanism of the gimbals 75 will be described below. FIG. 7 is a sectional view showing the structure of principal part of the optical system of the optical motion correction means. The lens 72 is supported by a support member 75y which has a degree of freedom in the y-axis direction, and the support member 75y is supported by a support member 75x having a degree of freedom in the x-axis direction perpendicular to the y-axis direction. Furthermore, the support member 75x is supported by a lens barrel 74.

With this arrangement, a correction optical system with degrees of freedom in two axis directions can be realized.

A typical zoom lens system upon combination of the motion correction means having the above-mentioned variable angle prism and a zoom lens will be exemplified below. In this case, an inner or rear focus type zoom lens system which attains focusing by a lens group behind a variator lens group for zooming will be exemplified.

Various lens systems of such a lens type are known. In this case, a lens arrangement which uses the rearmost lens group for focusing will be exemplified. FIG. 8 is a sectional view showing the arrangement of the lens system. Referring to FIG. 8, the lens system includes a stationary front-element lens group 111, a variator lens group 112, a stationary lens group 113, and a focus (compensator) lens group 114. The lens system also includes an anti-rotation guide rod 133, a variator feed rod 134, a stationary lens barrel 135, an iris unit 136 (which is inserted in a direction perpendicular to the plane of the drawing of FIG. 8), a stepping motor 137 serving as a focus motor, and an output shaft 138 of the stepping motor. A male screw is formed on the output shaft 138 so as to move the lens. A female screw portion 139 meshes with this male screw, and is integrated with a movable frame 140 for the lens group 114. The lens system further includes guide rods 141 and 142 for the movable frame of the lens group 114, a rear plate 143 for aligning and pressing the guide rods, and a relay holder 144. The lens system also includes a zoom motor 145, a deceleration unit 146, and interlocking gears 147 and 148. The interlocking gear 148 is fixed to the zoom (variator) feed rod 134.

With the above-mentioned arrangement, when the stepping motor 137 is driven, the focus lens group 114 moves in the optical axis direction by a screw feed mechanism. When the zoom motor 145 is driven, the gears 147 and 148 are interlocked with each other, and the rod 134 is rotated, thus moving the variator lens group 112 in the optical axis direction.

The positional relationship between the variator lens and the focus lens in the above-mentioned lens system will be described in correspondence with some distances. FIG. 9 is a graph showing the relationship between the variator position and the focus lens position. In this case, FIG. 9 shows the in-focus positional relationships for objects separated by distances of infinity ∞, 2 m, 1 m, 80 cm, and 0 cm. In the inner focus lens system, since the positional relationship between the variator and focus lenses varies depending on the object distance, the lens groups cannot be interlocked by a simple mechanical structure like a cam ring of a front-element focus lens system.

Therefore, if the zoom motor 145 is simply driven in the structure shown in FIG. 8, an out-of-focus state occurs. Since the inner focus lens system has the above-mentioned characteristics, its practical application is not easily attained although it has an advantage of "a small number of constituting lenses" and the like in addition to the above-mentioned advantage "good closest-distance photographing performance".

However, in recent years, a control technique of attaining an optical lens positional relationship shown in FIG. 9 in correspondence with the object distance has been developed, and is applied to commercial products. For example, Japanese Laid-Open Patent Application Nos. 1-280709 (U.S. Pat. No. 4,920,369), 1-321416, and 2-144509 proposed by the present applicant each disclose a method of tracking a locus representing the positional relationship between the two lenses in correspondence with the distance.

In Japanese Laid-Open Patent Application No. 1-280709, the positional relationship between the variator and compensator (focus lens) is maintained by a method shown in FIGS. 10 to 12. FIG. 10 is a block diagram of a lens control circuit corresponding to FIGS. 8 and 9. Referring to FIG. 10, lens groups 111 to 114 are the same as those shown in FIG. 8. The position of the variator lens group 112 is detected by a zoom encoder 149. Note that the encoder may comprise a volume encoder in which a brush integrally attached to a variable movable ring slides along a circuit board printed with a resistor pattern. An iris encoder 150 detects the iris value, and uses, e.g., an output from a Hall element in an iris meter. An image pickup element 151 such as a CCD is connected to a camera processing circuit 152. A Y (luminance) signal output from the camera processing circuit 152 is supplied to an AF circuit 153. The AF circuit 153 discriminates the in-focus or out-of-focus state. In the case of the out-of-focus state, the circuit 153 discriminates the near or far focus state and the defocus amount. These discrimination results are supplied to a CPU 154. A power-ON reset circuit 155 performs various reset operations when the power switch is turned on. A zoom operation circuit 156 supplies the operation contents of a zoom switch 157 by an operator to the CPU 154. A memory unit of locus data shown in FIG. 8 stores direction data 158, speed data 159, and boundary data 160. A zoom motor driver 161 and a stepping motor driver 162 are connected to the CPU 154. The number of input pulses from the stepping motor is continuously counted by the CPU 154, and the count value is used as an encoder of the absolute position of the focus lens. In this arrangement, since the variator position and the focus lens position are respectively determined by the zoom encoder 149 and the number of input pulses from the stepping motor, one point on the map shown in FIG. 9 is determined. On the other hand, the map shown in FIG. 9 is divided into small strip-shaped regions on the basis of the boundary data 160. FIG. 11 is an explanatory view showing the relationship between the variator position and the focus lens position, which is divided into strip-shaped regions. In FIG. 11, a hatched portion corresponds to a region where the lenses are inhibited from being disposed. When one point on the map is determined in this manner, a small region to which the point belongs can be determined.

The speed and direction data are stored in units of regions as the rotational speeds and directions of the stepping motor, which are calculated on the basis of the locus passing the centers of the regions. For example, FIG. 11 is divided into 10 zones. Assuming that the zoom time requires 10 sec, the passing time per zone is 1 sec, as a matter of course. FIG. 12 is an enlarged explanatory view of block III. A locus 164 passes the center of block III, a locus 165 passes the lower left corner of block III, and a locus 166 passes the upper right corner of block III. Note that the central locus can be tracked without causing any error if the lens moves at a speed of x mm/sec.

If the speed calculated in this manner is called a region representative speed, the speed memory stores values in correspondence with the number of small regions. If this speed is represented by reference numeral 168, the representative speed is finely adjusted like a speed 167 or 169 in correspondence with the detection result of an auto focus detection device, thereby setting the stepping motor speed. In addition, since the rotation direction of the stepping motor changes depending on a region even in a zoom operation from the telephoto end to the wide end (or vice versa), a sign indicated by the direction data is stored.

As described above, when the focus lens position is controlled by driving the stepping motor in the zoom driving operation using the stepping motor speed which is determined by correcting the region representative speed calculated based on the variator position and the focus lens position is corrected on the basis of the detection result of the auto focus detection device, an out-of-focus state during the zoom driving operation can be prevented even in the inner focus lens system.

Note that the following method is also proposed (U.S. Pat. No. 5,005,956). In this method, the speeds indicated by the arrows 167, 169, and the like are stored in units of blocks in addition to the representative speed indicated by the arrow 168, and one of the three speeds is selected in correspondence with the detection result of the auto focus detection device.

In place of the method of storing the speeds, the following method is known. In this method, some curves representing the focus lens positions corresponding to a plurality of variator positions are stored in correspondence with the object distances of ∞, 2 m, 1 m, and the like shown in FIG. 9, and when the object distance is an intermediate distance between the stored curves, the positional relationship to be set of the two lens groups is interpolated using the data of the stored curves. FIG. 13 is a sectional view showing the arrangement of the motion correction means obtained when the variable angle prism is coupled to a zoom lens system. Referring to FIG. 13, a rotation shaft portion 263 is arranged integrally with a holding frame 28, and a rotation shaft 267, at the side opposite to the rotation shaft 263, is not integrally arranged with the holding frame 28 but is constituted by press-fitting a shaft consisting of a metal such as stainless steel into the holding frame. A leaf spring 268 is fixed by a screw 269. A flat glass 266 is arranged to avoid, e.g., a photographer from directly touching and damaging the variable angle prism. A mounting screw 265 is used for mounting an accessory. A stationary lens barrel member 264 includes holes for receiving the rotation shafts of the variable angle prism.

The lens barrel member 264 is fastened to a stationary lens barrel 135 of the zoom lens system by screws 270. In FIG. 13, a holding frame for pivoting the front-side glass of the variable angle prism, actuators, and sensor members for detecting the angles are not shown for the sake of simplicity.

The examples using the variable angle prism and the movable correction optical system as the optical blur correction means, and the zoom lens systems combined with these optical motion correction means have been described.

A prior art associated with so-called electronic means as the motion detection means will be briefly described below. FIG. 14 is a block diagram showing the arrangement of the electronic motion detection means. This motion detection means is described in Japanese Laid-Open Patent Application No. 2-75283 (U.S. Pat. No. 5,107,293). An image pickup signal from a CCD is amplified by a preamplifier 313, and the amplified signal is supplied to a motion detection circuit 351. In this circuit, the frame is divided into a plurality of blocks, feature points are extracted in units of blocks, and the feature points are compared with those of a temporally different field frame, thereby calculating motion vectors in units of blocks. A motion vector memory 352 stores the motion vectors in units of blocks on the frame, which are calculated by the motion detection circuit 351, for one frame. A representative vector operation circuit 353 operates and synthesizes the motion vector data of the respective blocks stored in the memory 352 in accordance with a predetermined algorithm, and outputs a representative motion vector V for one frame. With the above-mentioned basic arrangement, the direction of a motion can be obtained as the representative vector.

Note that FIG. 14 also includes peripheral circuits such as a circuit 354 for weighting the respective blocks upon calculation of the representative vector, a mode input circuit 315 used for the purpose of varying the weighting contents in correspondence with a mode, and the like.

In the above-mentioned motion prevention apparatus, in order to remove an unnecessary motion, the motion correction means is driven in correspondence with the detection result of the motion detection means, thereby removing a motion. However, in practice, in the case of an apparatus such as a video camera for photographing dynamic images, if the motion correction means faithfully responds to, e.g., a panning operation that a photographer intended, another problem is posed. In order to solve this problem, it is checked based on the frequency, amplitude, and the like of the detected motion if the motion is to be corrected by the motion correction means, and if it is determined that the motion is caused by a panning operation, the motion correction means is inhibited from responding to the motion.

For this reason, when a photographer performs a photographing operation without looking into the finder, and an object gradually deviates from the center of the frame, if the motion prevention apparatus determines this motion as a panning operation, the object may deviate from the center of the frame and fall outside the frame. In addition to such a specific condition, if the motion correction means is inhibited from responding to frequency components (mainly, low frequency components), determined as a panning operation, of those of a motion (in an actual arrangement, for example, the output from the motion detection means is supplied to a low-cut filter), only a vibration of low frequency components remains. As a result, only a slow vibration may remain on the frame. Furthermore, when the motion detection means comprises a sensor such as an acceleration sensor, if the sensor does not have a sufficient detection frequency range, a similar phenomenon may occur.

One of the arrangements for solving these problems is disclosed in Japanese Laid-Open Patent Application No. 5-304631 proposed by the present applicant. The position, in the frame, of a principal object, which cannot be detected by the conventional motion detection means is specified by detecting the viewpoint that indicates the viewpoint position, in the finder, of a photographer. Based on this position information, a photographing operation according to the photographer's intention is attained. For example, in the above-mentioned disclosure, when an object is specified by viewpoint detection means, the detection region of the above-mentioned electronic motion detection means is limited to a region other than the object (the motion vectors in units of blocks on an object are not used). With this control, in a recorded image, the movement of the background image is inhibited, and only a natural movement of the object is permitted. In other words, an image free from a motion can be obtained as if it were photographed by a camera fixed on a tripod.

However, in the prior art, no countermeasures are taken against the following problems, and further improvements are demanded.

(a) When the viewpoint detection means recognizes an object, if the viewpoint position is always determined as the object position, an operation error may occur when the viewpoint gazes at a position other than the object.

(b) It is difficult to hold an object within the field angle when a hand-held no-finder photographing operation is performed for a large focal length.

(c) It is difficult to remove unnecessary motion components and to obtain a high-quality recorded image when a moving object to be photographed is tracked by a panning operation and is kept held at the center of the frame.

(d) No proposal associated with a technique for holding an object within a frame is made.

Note that as the prior applications of a tracking apparatus by the present applicant, U.S. Pat. Nos. 5,031,049 and 4,872,058 are known, and as the prior application of the vibration prevention apparatus, U.S. Pat. No. 5,012,270 or the like is known.

SUMMARY OF THE INVENTION

The present invention has been made to solve the above-mentioned problems, and has as its first object to provide an image pickup apparatus which tracks an object, recognized by a photographer, to hold it within a frame.

In order to achieve the above object, according to a preferred aspect of the present invention, there is disclosed an image pickup apparatus comprising viewpoint detection means for detecting a viewpoint of a photographer on the basis of a picked-up image of an object, feature detection means for detecting a feature of the object from the position including the detected viewpoint of the photographer, registration means for registering the detected feature of the object, and tracking means for tracking the object on the basis of the registered feature.

It is the second object of the present invention to provide an image pickup apparatus which allows a highly precise and accurate motion correction operation using a viewpoint detection technique.

It is the third object of the present invention to provide an image pickup apparatus which can improve tracking accuracy by utilizing a viewpoint detection technique in the detection and registration of a feature of an object to be tracked.

Other objects and features of the present invention will become apparent from the following description taken in conjunction with the accompanying drawings.

BRIEF DESCRIPTION OF THE DRAWINGS

FIGS. 1A to 1C are explanatory views showing a variable angle prism;

FIGS. 2A and 2B are explanatory views showing a motion removal state;

DETAILED DESCRIPTION OF THE PREFERRED EMBODIMENTS

Figure 3:
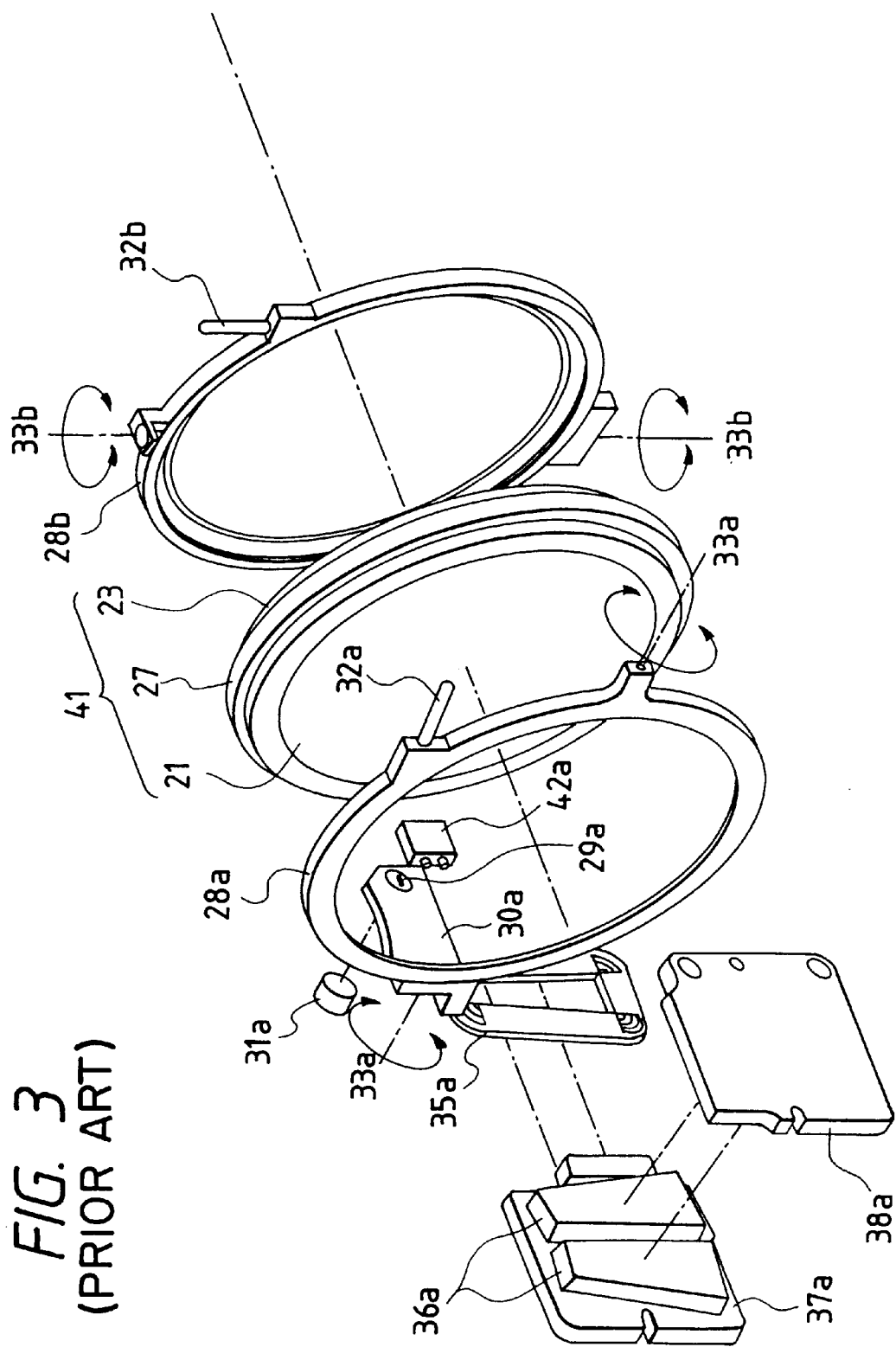
FIG. 3 is an exploded perspective view showing an actual arrangement of a variable angle prism unit including a variable angle prism, an actuator unit for driving the prism, and an angle sensor for detecting the angle state of the prism.
Figure 4:
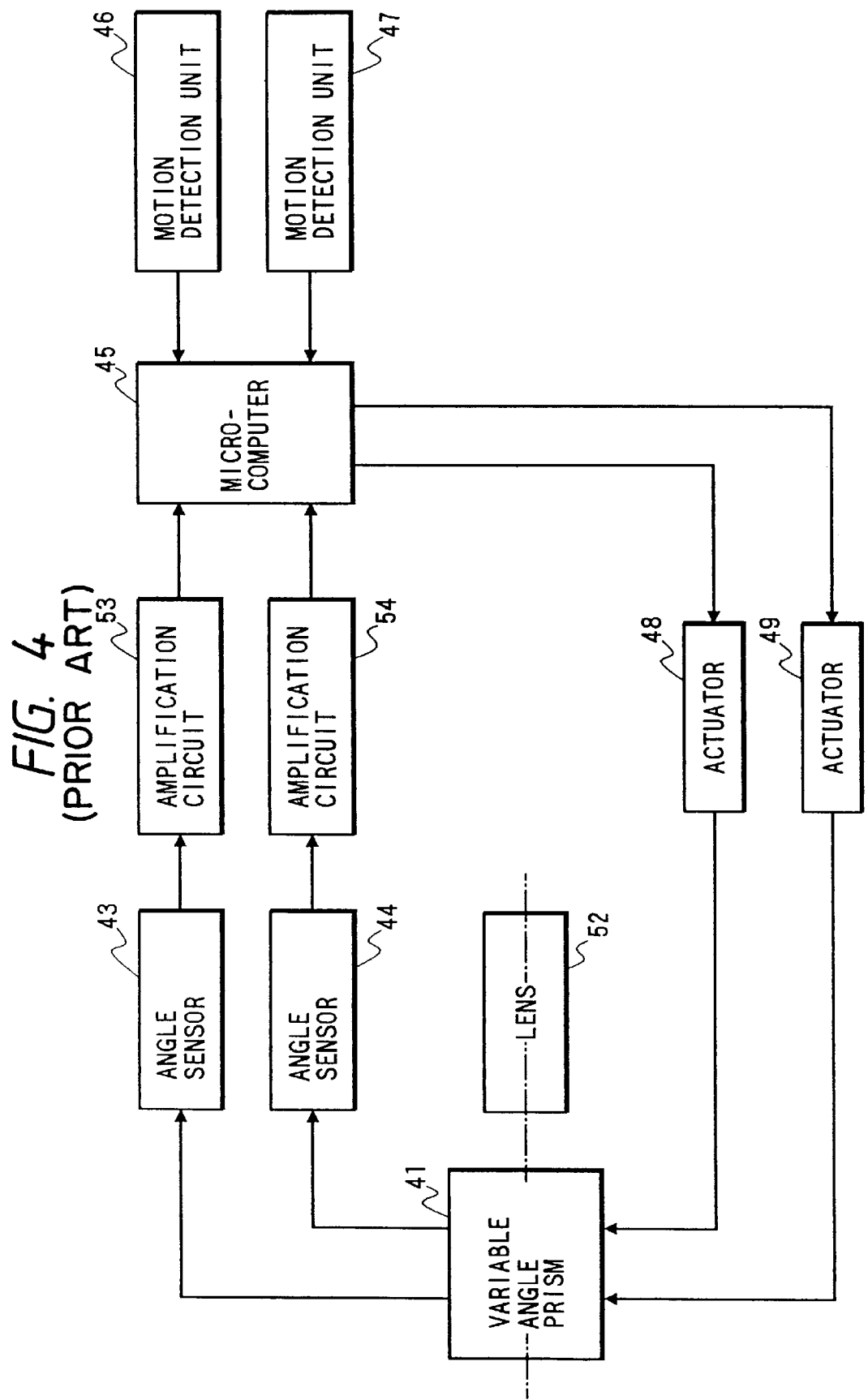
FIG. 4 is a block diagram showing a vibration prevention lens system in which a motion prevention apparatus which comprises a variable angle prism as motion correction means is combined with a lens system.
Figure 5:
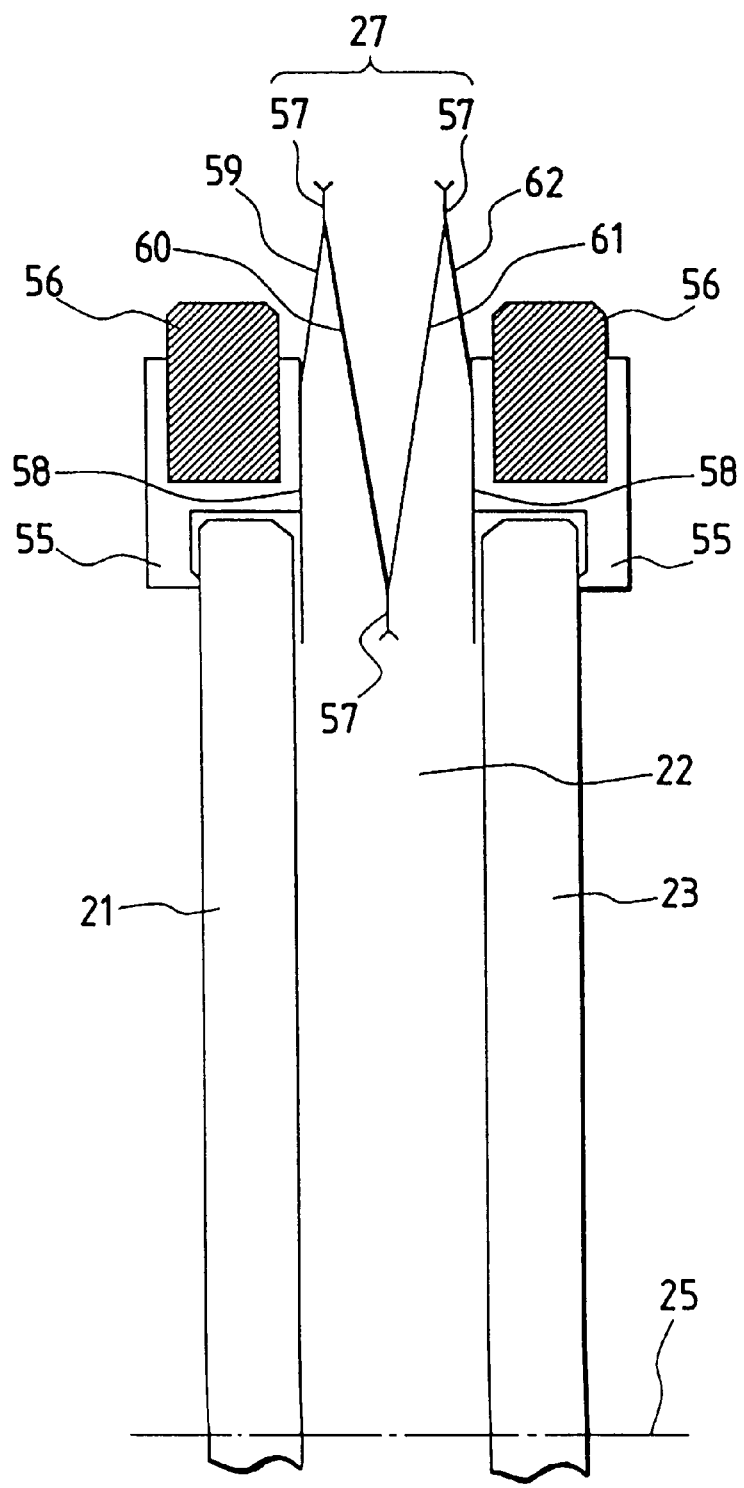
FIG. 5 is a sectional view showing the detailed structure of a conventional variable angle prism.
Figure 6:
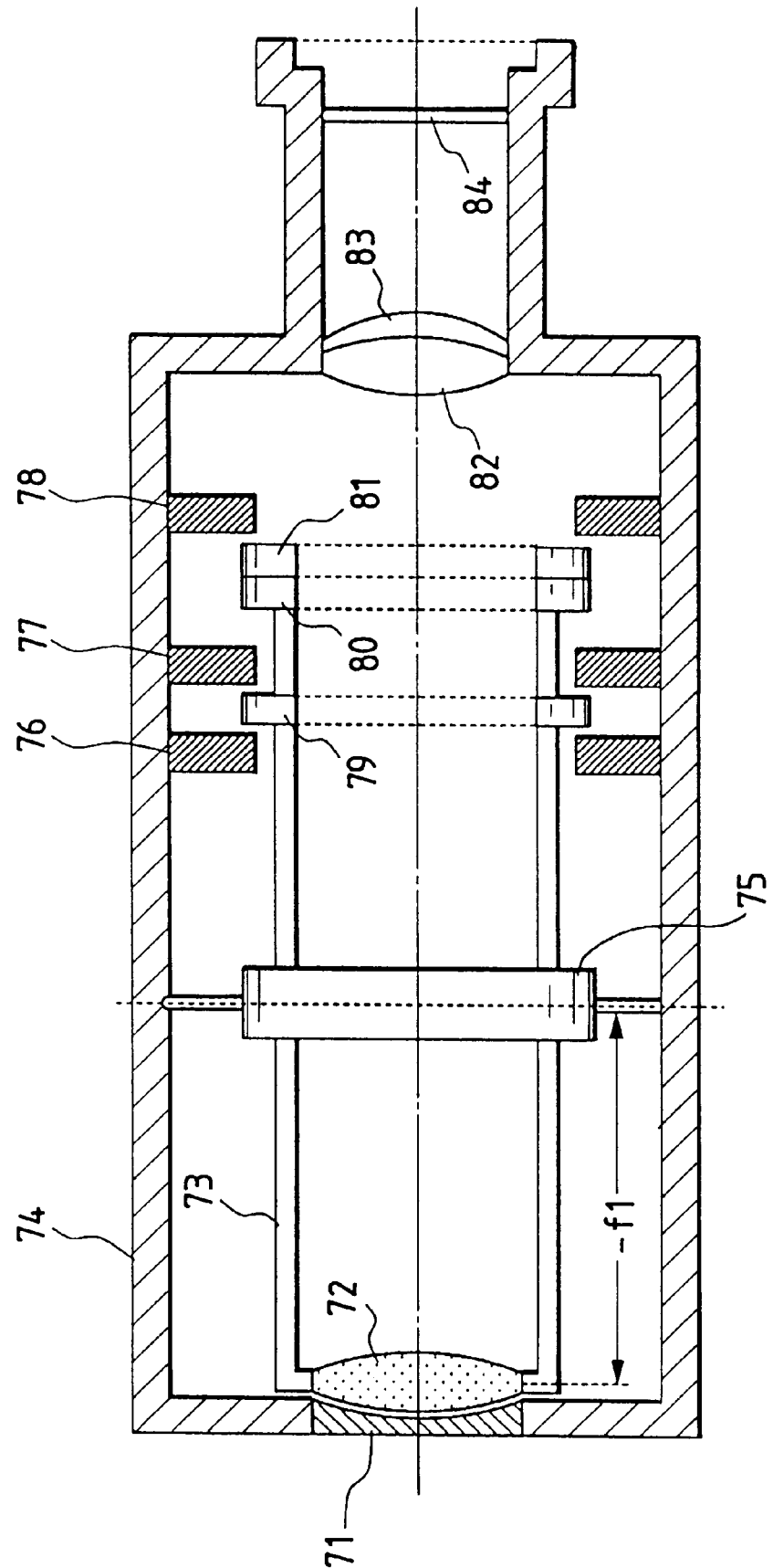
FIG. 6 is a sectional view showing the arrangement of the overall optical system of optical motion correction means.
Figure 7:
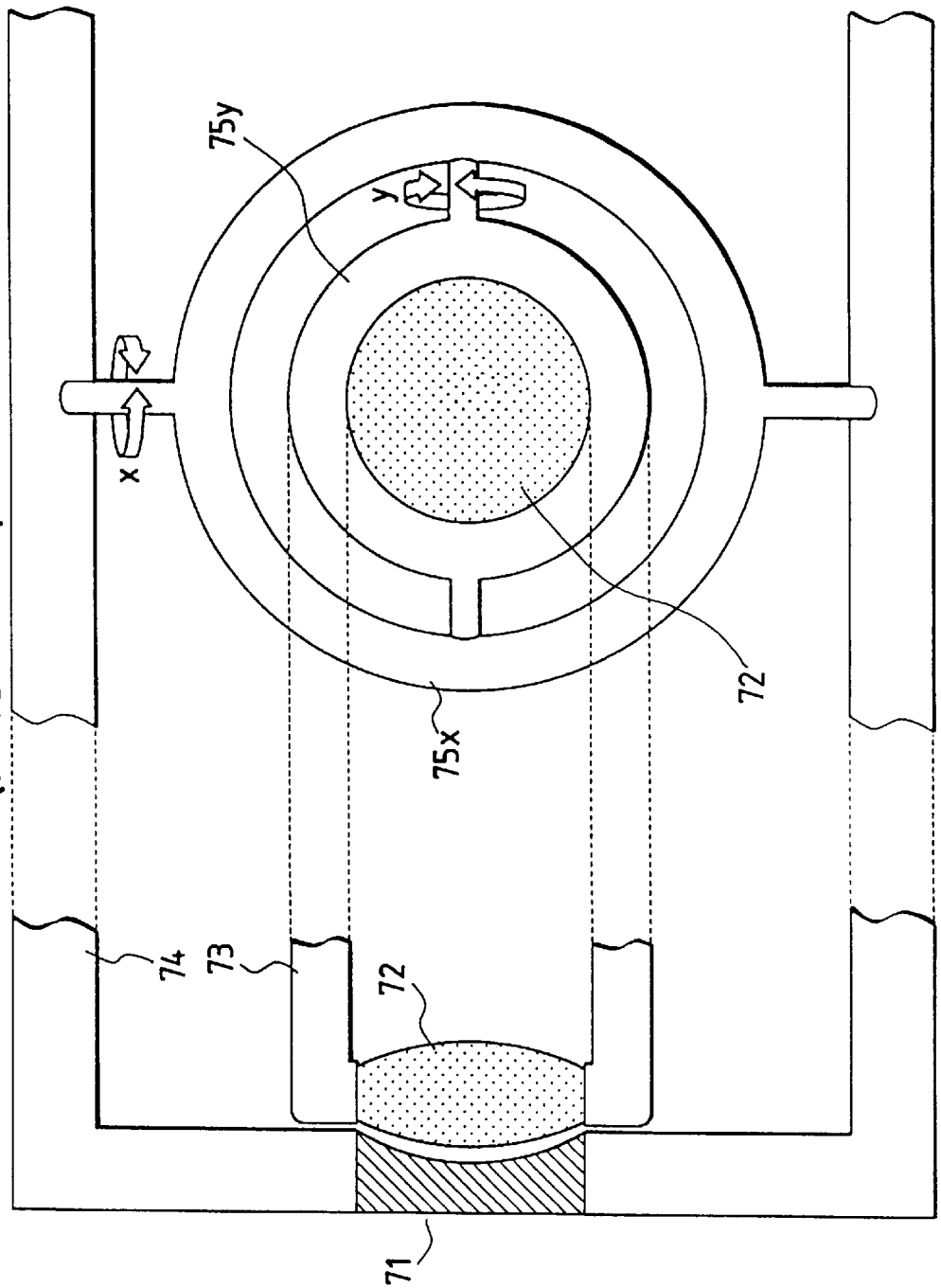
FIG. 7 is a sectional view showing the structure of principal part of the optical system of the optical motion correction means.
Figure 8:
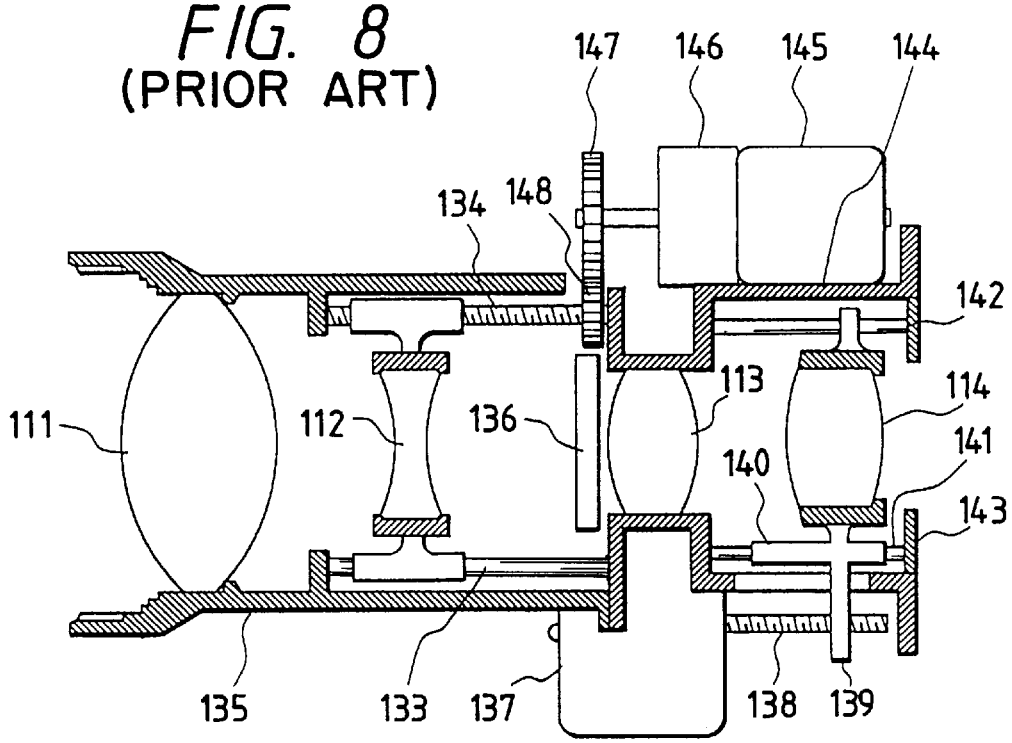
FIG. 8 is a sectional view showing the arrangement of a lens system.
Figure 9:
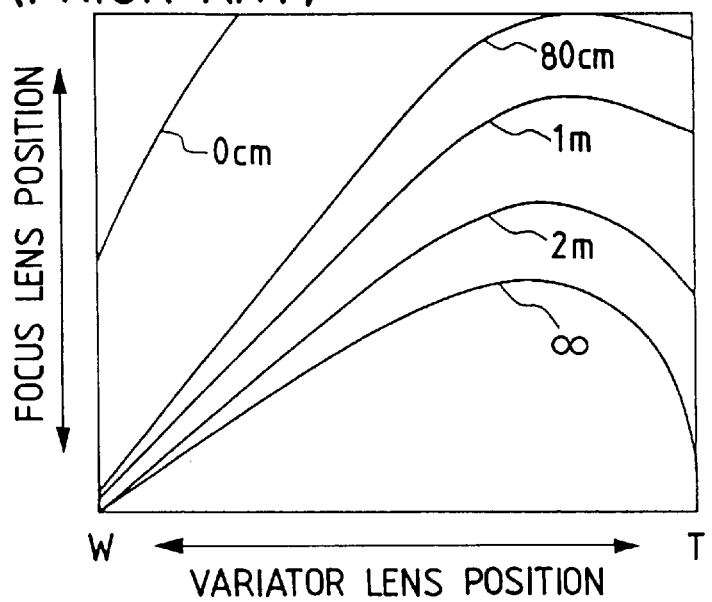
FIG. 9 is a graph showing the relationship between the variator position and the focus lens position.
Figure 10:
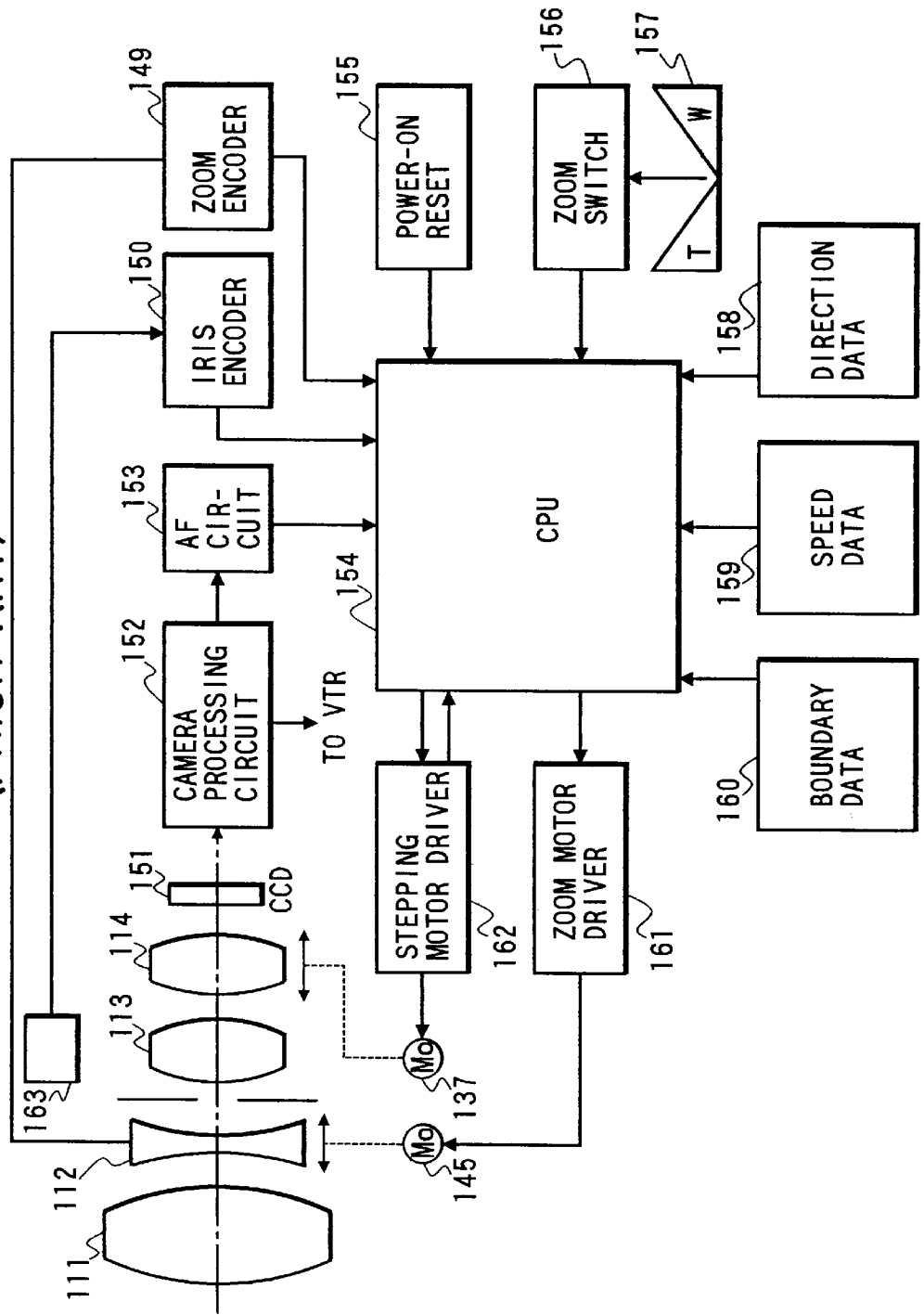
FIG. 10 is a block diagram showing a lens control circuit corresponding to FIGS. 8 and 9.
Figure 11:
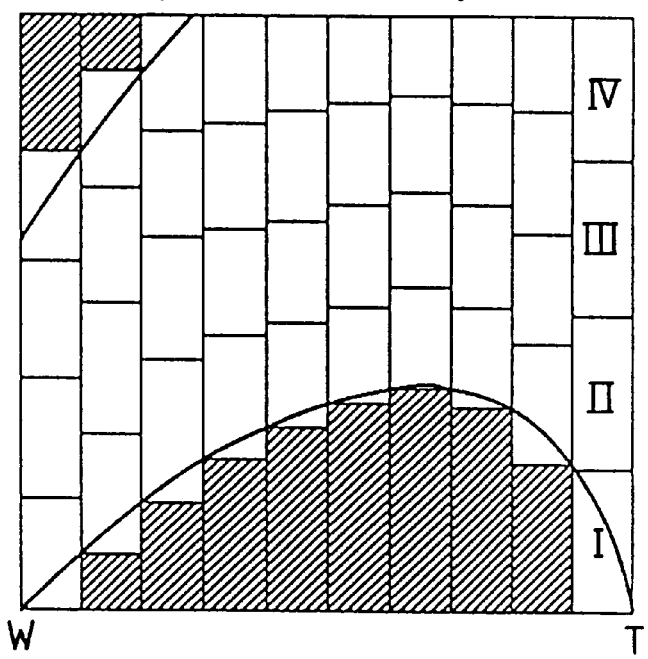
FIG. 11 is an explanatory view showing the relationship between the variator position and the focus lens position, which is divided into strip-shaped regions.
Figure 12:
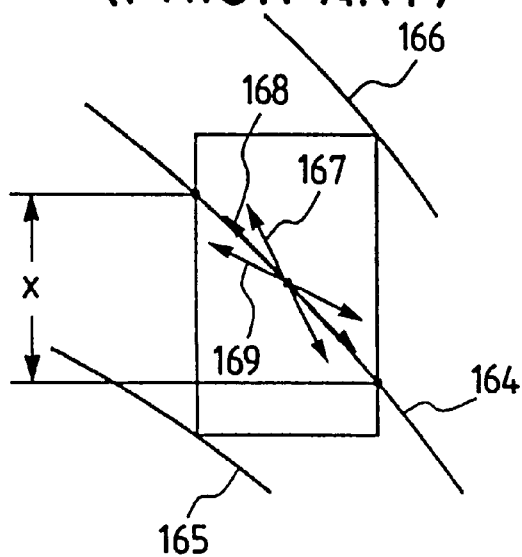
FIG. 12 is an enlarged explanatory view of block III in FIG. 11.
Figure 13:
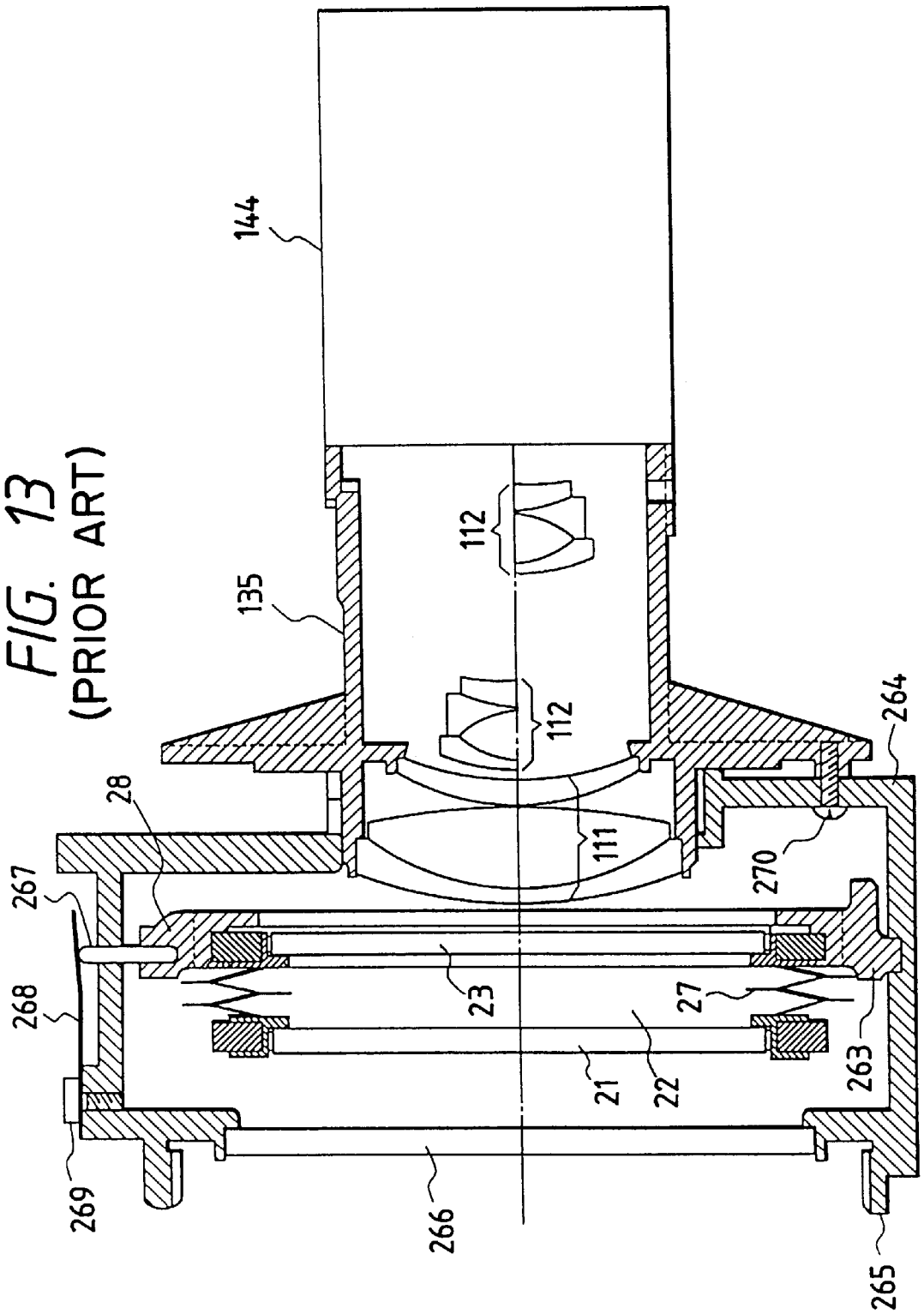
FIG. 13 is a sectional view showing the arrangement of motion correction means realized by coupling a variable angle prism to a zoom lens system.
Figure 14:
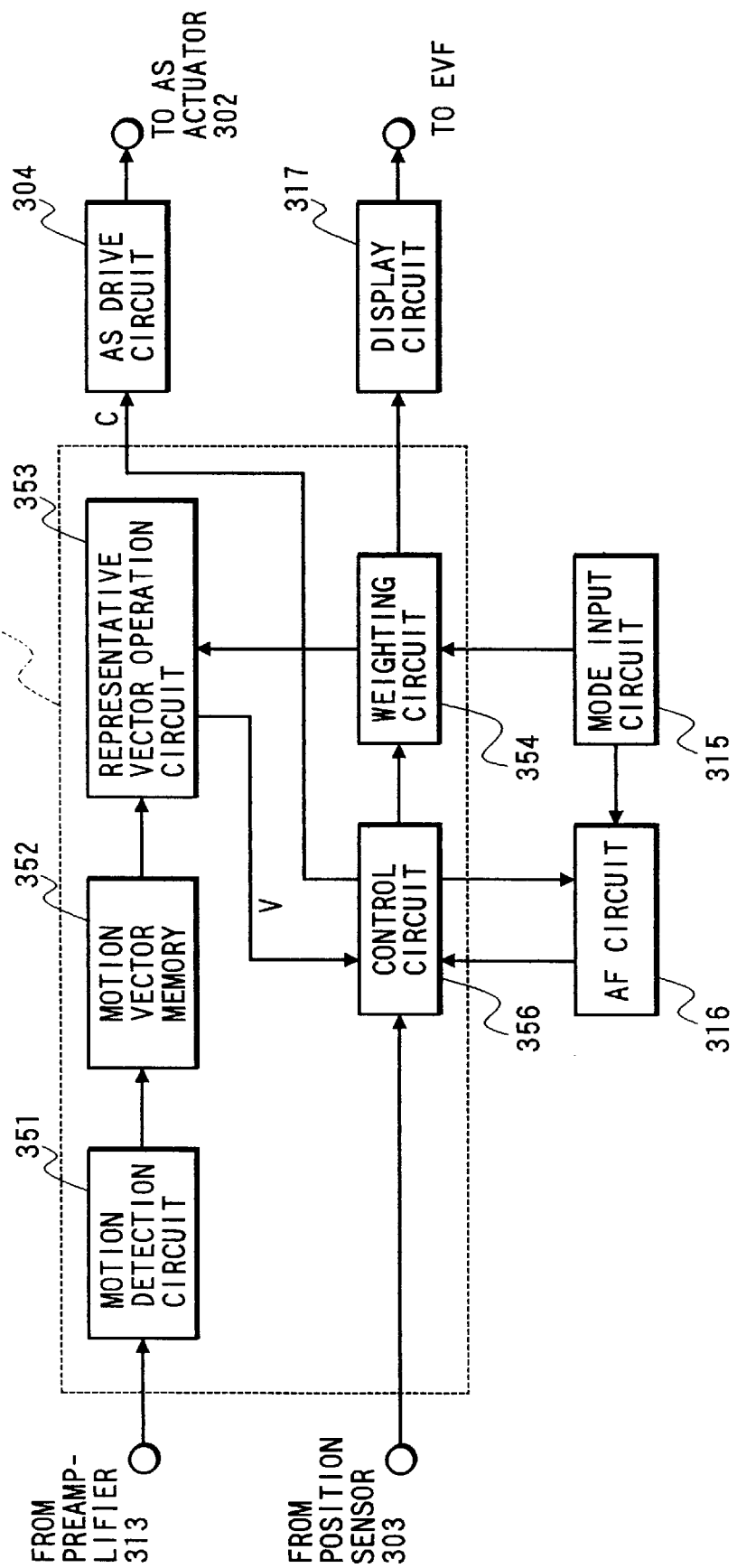
FIG. 14 is a block diagram showing the arrangement of electronic motion detection means.
Figure 15:
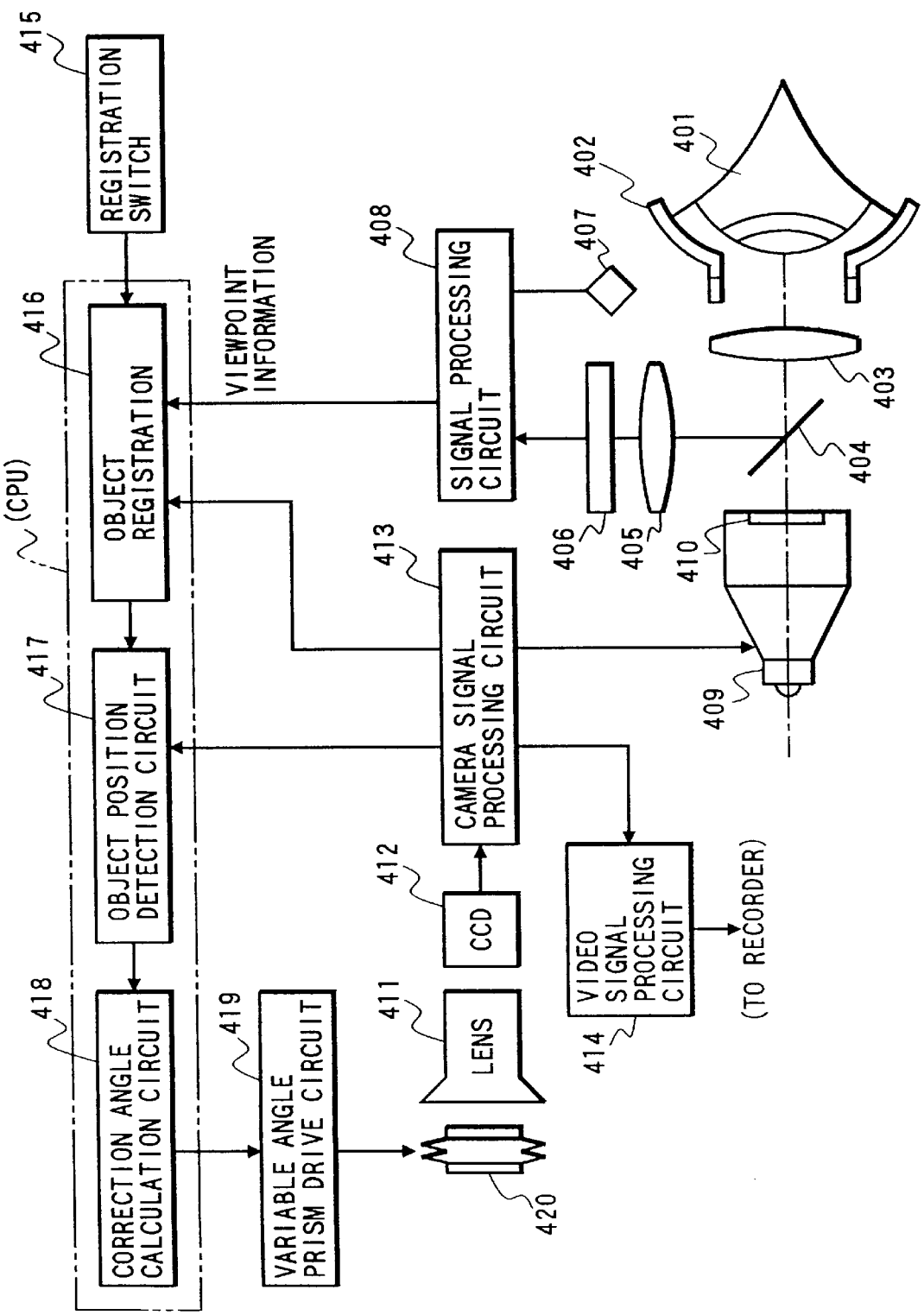
FIG. 15 is a block diagram showing the arrangement of an image pickup apparatus according to the first embodiment of the present invention.

FIG. 15 is a block diagram showing the arrangement of an image pickup apparatus according to the first embodiment. Referring to FIG. 15, 401 is the eyeball of a photographer. The apparatus shown in FIG. 15 comprises an electronic viewfinder (EVF) 409 having a finder screen 410, a dichroic mirror 404, an eyepiece 403, a light-receiving lens 405, a light-receiving element 406 such as a CCD, a light-emitting element 407 such as an infrared light-emitting diode, and a signal processing circuit 408. These components constitute a viewpoint detection apparatus for detecting the viewpoint position, in the finder screen, of a photographer. Since the detailed contents of the viewpoint detection apparatus have been described in, e.g., Japanese Laid-Open Patent Application No. 5-304631, only a brief explanation will be given herein. Note that an eyecup 402 is arranged adjacent to the eyepiece 403.

The apparatus also comprises a photographing lens 411, an image pickup element 412 such as a CCD, a camera signal processing circuit 413, a video signal processing circuit 414, an object registration circuit 416, a registration switch 415 which is used by a photographer to perform a registration operation, an object position detection circuit 417, a correction angle calculation circuit 418, a variable angle prism drive circuit 419 for driving a variable angle prism 420 on the basis of the calculation result of the correction angle calculation circuit 418, and the variable angle prism 420. The object registration circuit 416, the object position detection circuit 417, and the correction angle calculation circuit 418 are realized by a microcomputer (CPU).

When a photographer gazes at a principal object in the finder, the viewpoint of the photographer is detected by the above-mentioned viewpoint detection apparatus. When the photographer operates the registration switch 415 in this state, the object registration circuit 416 fetches the information at the viewpoint position, and stores the information as the feature of the object. For example, color information, contrast information, information associated with the shape of the object, and the like are stored. These pieces of information are obtained from a video signal, which is obtained by processing an object image, formed on the image pickup element 412 by the photographing lens 411, by the camera signal processing circuit 413. This registration operation is performed only when the photographer operates the registration switch 415. Based on the registered object information, the object position detection circuit 417 detects the object position in the video signal by detecting the registered object information for each field.

The correction angle calculation circuit 418 determines based on the detected object position whether or not the variable angle prism 420 is to be driven to hold the object at the center of the frame or within a predetermined range including the center of the frame. Furthermore, when it is determined that the variable angle prism 420 is to be driven, the circuit 418 calculates the drive amount of the prism 420. Note that the correction angle calculation circuit 418 may hold the object position not at the center of the frame but at the position upon registration of the feature of the object.

The variable angle prism drive circuit 419 drives the variable angle prism 420 on the basis of the calculated correction angle.

With the above-mentioned arrangement, an object can be kept held at the center of the frame on the basis of information possessed by the object itself. Note that the circuits 416 to 418 may be realized by the microcomputer (CPU) like in this embodiment, but may also be realized by discrete circuits.

In this embodiment, the variable angle prism 420 is used as optical axis correcting means. Alternatively, another optical means as optical axis correcting means may be used. The optical axis correcting means may be commonly used as motion correction means for a motion prevention apparatus.

Figure 16:
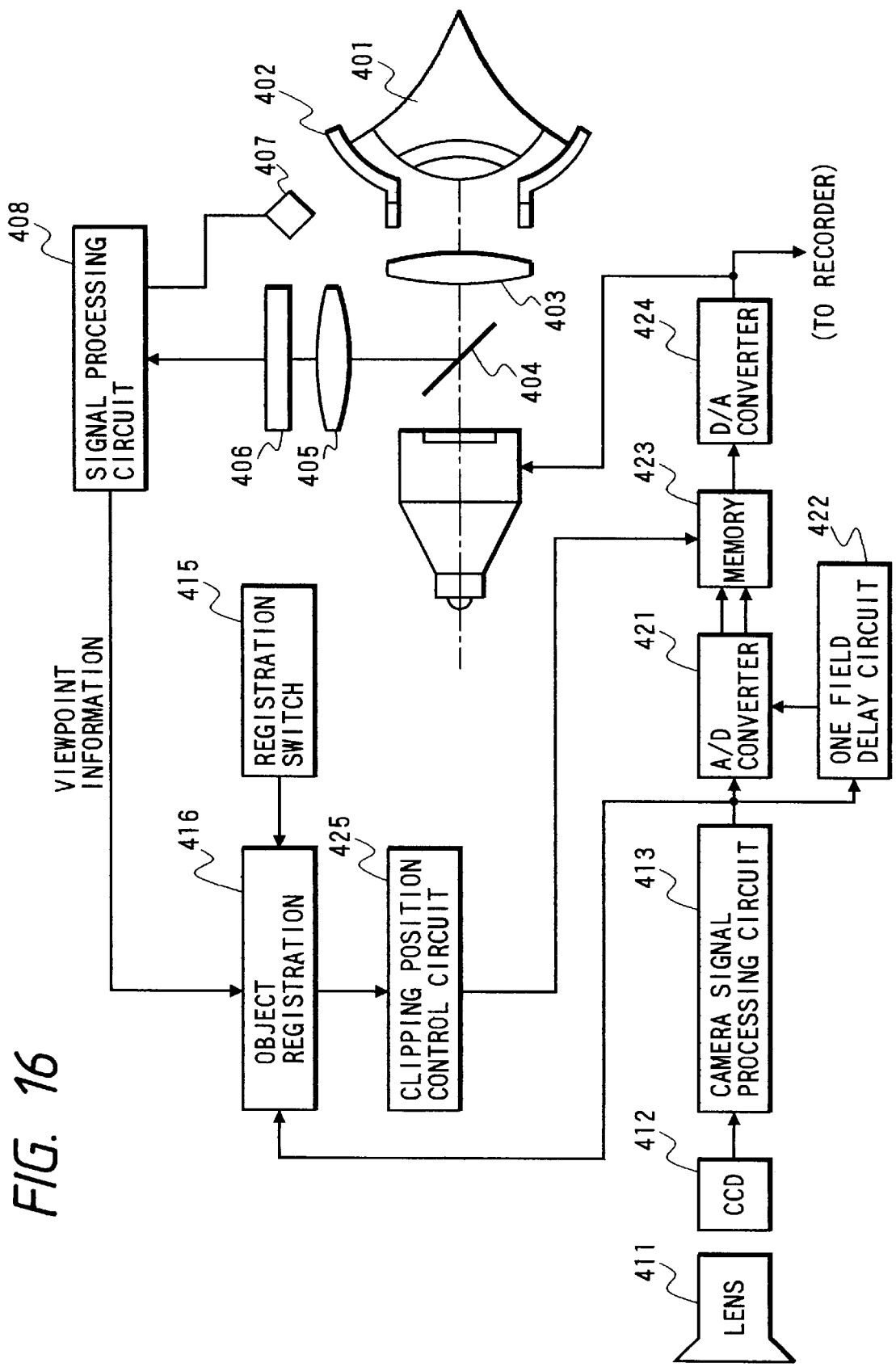
FIG. 16 is a block diagram showing the arrangement of an image pickup apparatus according to the second embodiment, which adopts another optical means as optical axis correcting means.

FIG. 16 is a block diagram showing the arrangement of an image pickup apparatus according to the second embodiment, which adopts another optical means as optical axis correcting means. As in the first embodiment, an object is selected by a viewpoint detection apparatus, and object information used for tracking processing is registered in correspondence with the selected object. Also, the same reference numerals in FIG. 16 denote the same parts as in the first embodiment. The apparatus shown in FIG. 16 includes a one field delay circuit 422, an A/D converter 421, a memory 423, a D/A converter 424, and a clipping position control circuit 425 as electronic correction means for determining a clipping position.

A video signal is subjected to predetermined processing in the camera signal processing circuit 413, and thereafter, the processed signal is converted into a digital signal by the A/D converter 421. In this case, two signals having a one-field time difference therebetween, i.e., signals with and without being delayed by the one field delay circuit 422 are converted, and the two digital video signals are stored in the memory 423.

The feature of an object registered by the same method as in the first embodiment is supplied to the clipping position control circuit 425. The clipping position control circuit 425 detects the position, on the frame, registered as the feature of the object on the basis of the two pieces of stored frame information, and changes the current clipping position by the difference between the principal object positions on the two frames obtained based on the previous clipping position, so that the object position is located at the same position as that on the frame one field before. As a result, the principal object position on the frame upon registration of the principal object is maintained in the subsequent processing.

As described in Japanese Laid-Open Patent Application No. 5-304631, when the clipping position is determined upon comparison of positions other than the registered object position on the frame, an image with a still background image can be obtained.

Furthermore, when the object is to be recorded at the registered position on the frame or at a predetermined position such as a central position, the object position on the frame may be calculated without calculating the difference between the positions of the two frames, i.e., without using the image signal one field before, and the clipping position may be determined so that the calculated position becomes a predetermined position.

Figure 17:
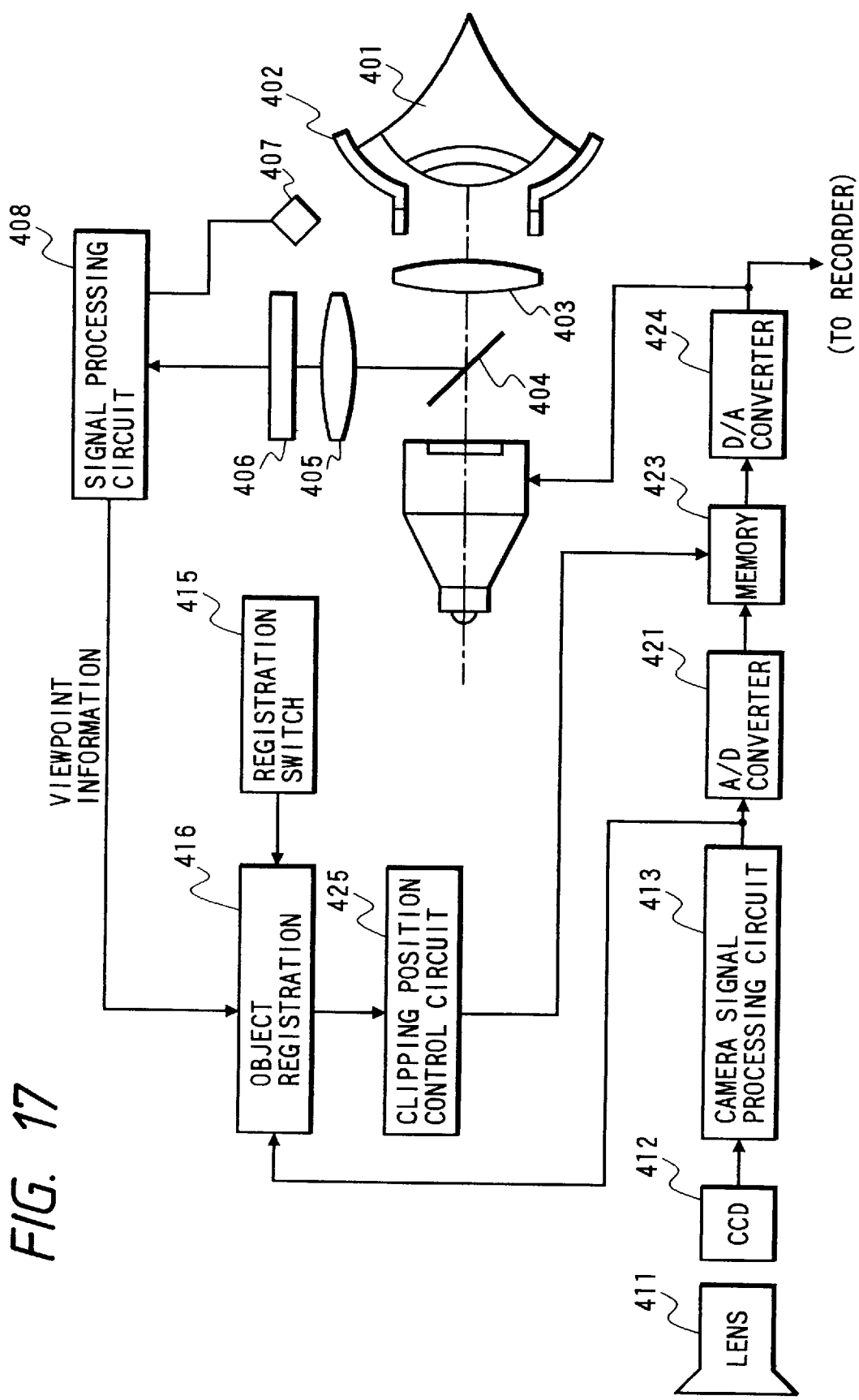
FIG. 17 is a block diagram showing the arrangement of an image pickup apparatus according to the third embodiment of the present invention.

FIG. 17 is a block diagram showing the arrangement of an image pickup apparatus according to the third embodiment of the present invention. The image pickup apparatus of the third embodiment has an arrangement from which the one field delay circuit 422 of the second embodiment is omitted. With this arrangement, although images between two fields can no longer be compared, a registered principal object can be disposed at a registered position.

In the above description, all the features of a principal object are registered, and the principal object position in the frame is adjusted on the basis of the registered features of the principal object. Upon registration, when a still background image such as a building, mountain, or the like is registered, the field angle of the camera can be fixed as in a photographing operation using a tripod.

An image pickup apparatus according to the fourth embodiment will be described below. The image pickup apparatus of the fourth embodiment adopts the following arrangement to prevent deterioration of image quality due to high-frequency motion components which cannot be detected at the detection period (e.g., one field (1/60 sec)) of the object position detection circuit 417, or to eliminate an unnatural image recorded upon movement of an object within a predetermined range due to a motion, when an object image is to be held at a predetermined position or within the predetermined range in the frame.

Figure 18:
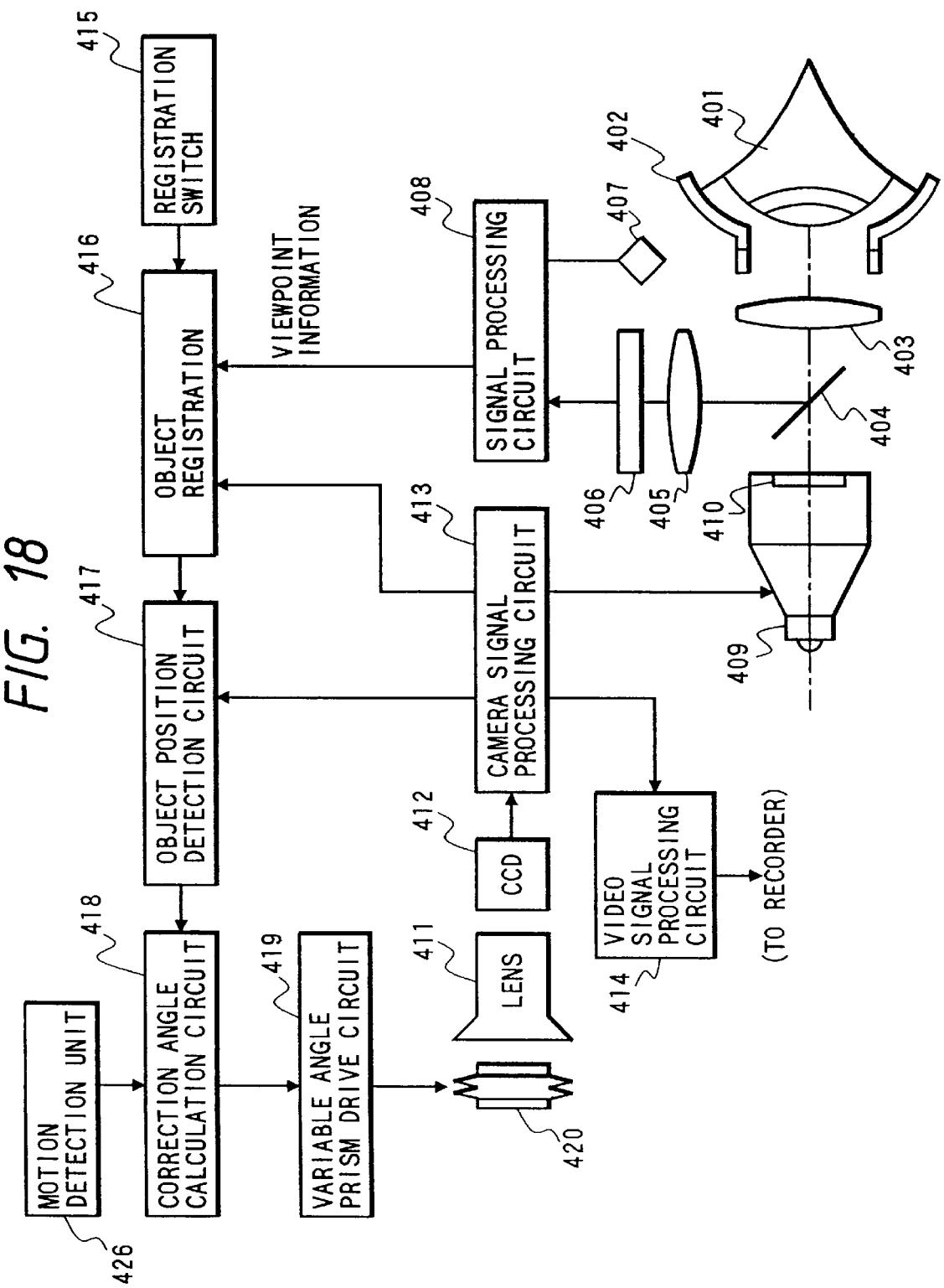
FIG. 18 is a block diagram showing the arrangement of an image pickup apparatus according to the fourth embodiment of the present invention.

FIG. 18 is a block diagram showing the arrangement of the image pickup apparatus according to the fourth embodiment. Referring to FIG. 18, a motion detection unit 426 detects a motion of a camera. The correction angle calculation circuit 418 detects the object position in the frame on the basis of the output from the object position detection circuit 417, and determines the correction angle on the basis of the detected object position and the detection result from the motion detection unit. With this arrangement, deterioration of image quality or recording of an unnatural image can be prevented.

Figure 19:
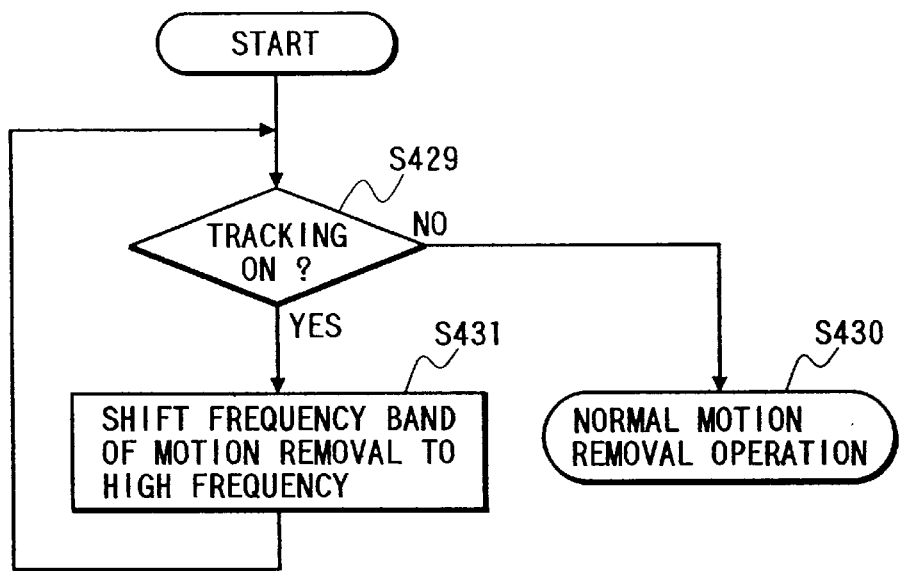
FIG. 19 is a flow chart showing the frequency band change processing routine.

When optical axis correction is performed based on both the signal output from the motion detection unit 426 and the position signal, in the frame, of the registered object, if these two signals are merely added to each other, an intended image cannot often be obtained. For this reason, the correction angle calculation circuit 418 performs simple separation of the frequency band. FIG. 19 is a flow chart showing the frequency band change processing routine. The correction angle calculation circuit 418 checks first if the tracking operation is ON (step S429). If the tracking operation is OFF, a normal motion removal operation is performed. However, if the tracking operation is ON, the circuit 418 fetches only high-frequency signal components (e.g., 5 Hz or higher) from the detection result of the motion detection unit 426 (step S431). Thus, the response frequency band for motion removal is limited as compared to the case wherein the tracking operation is OFF, and, in particular, a tracking operation which may be concentrated on the high-frequency band side with high possibility can be accurately performed.

An image pickup apparatus according to the fifth embodiment will be described below. The image pickup apparatus of the fifth embodiment can vary a predetermined range in the frame within which the object position is to be held. More specifically, when it is determined that a photographer wants to hold a moving object at the center of the frame, the predetermined range is narrowed; when it is determined that a photographer wants to capture an object within a predetermined field angle range, the predetermined range is widened.

With this control, when a child who is moving around is to be held at the center of the frame, or when a vehicle which is running away from the left to the right is to be held at the center of the frame, the predetermined range is narrowed, so that an object can be accurately captured at the center of the frame. On the other hand, when the movement of an object to be photographed is permitted within a predetermined field angle range, e.g., when a child who is skipping rope is to be photographed, a photographing operation can be attained without finely responding to the vertical movement of the child.

Figure 20:
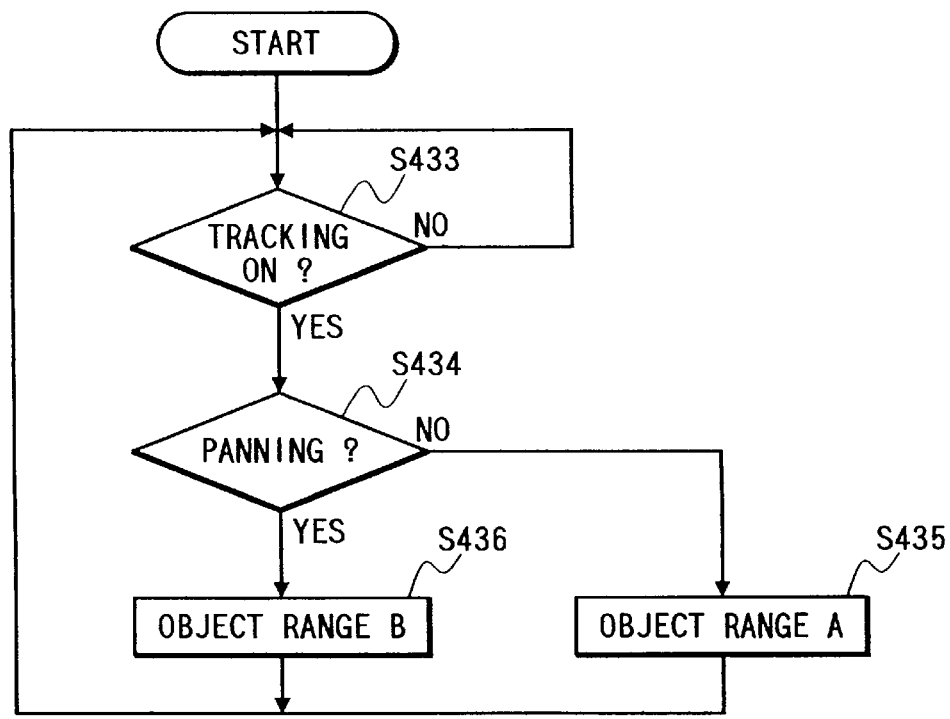
FIG. 20 is a flow chart showing the processing routine for determining a predetermined range in a correction angle calculation circuit 418.

FIG. 20 is a flow chart showing the processing routine for determining the predetermined range in the correction angle calculation circuit 418. When the processing is started, the correction angle calculation circuit 418 checks first if the tracking operation is ON (step S433). If the tracking operation is ON, the circuit 418 checks if a photographer is performing a panning photographing operation (step S434). If a panning photographing operation is being performed, a range B is selected as a range for capturing an object in the frame. On the other hand, if a panning photographing operation is not being performed, a range A is selected. FIG.

21 is an explanatory view showing the ranges A and B. With respect to the entire frame 427, the range B is set to be an inner range smaller than the range B.

Figure 22:
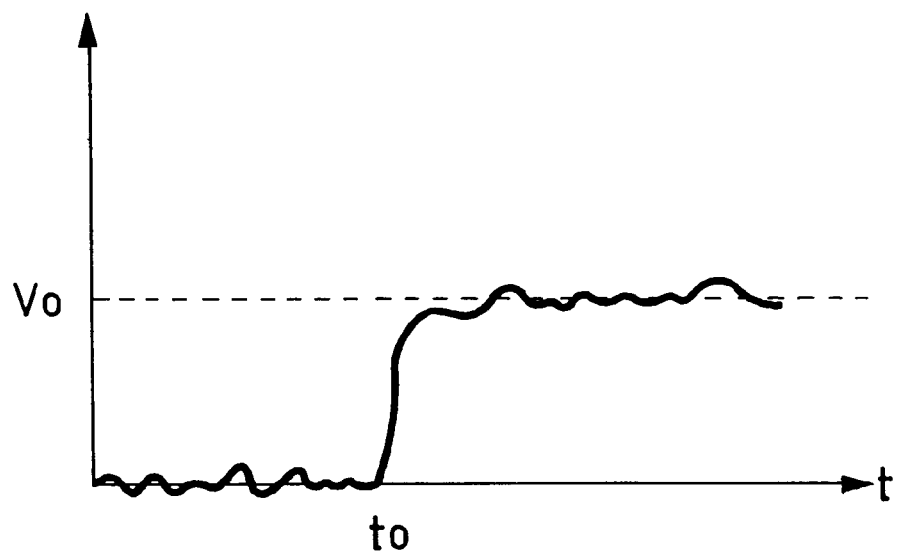
FIG. 22 is a graph showing a change in output from an angular velocimeter obtained when the abscissa is defined as the time base and the ordinate is defined as an axis for the output from the angular velocimeter serving as motion detection means.

Subsequently, a method of discriminating in step S434 if a panning photographing operation is being performed will be described below. FIG. 22 is a graph showing a change in output from an angular velocimeter obtained when the abscissa is defined as the time base and the ordinate is defined as an axis for the output from the angular velocimeter serving as motion detection means. A still photographing operation is performed up to time t0, and as a result, an output caused by a motion or the like is generated around zero angular speed. In contrast to this, when the panning photographing operation is performed, a signal as a sum of an output caused by the panning operation and an output caused by a motion or the like is generated after time t0. Therefore, when a value obtained by integrating the output from the angular velocimeter exceeds, e.g., a predetermined threshold value, it is determined that a panning photographing operation is performed.

Figure 21:
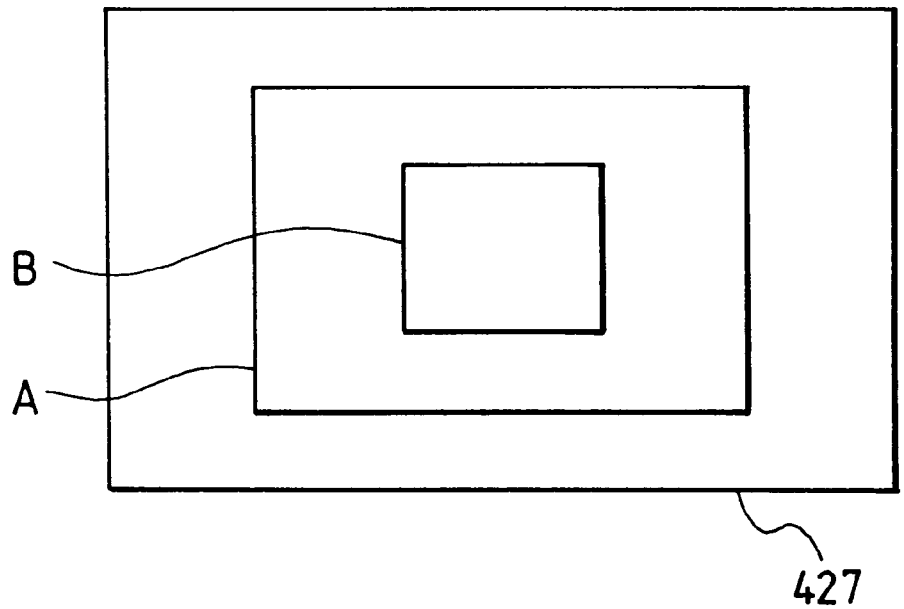
FIG. 21 is an explanatory view showing ranges A and B.

In this embodiment, as shown in FIGS. 20 and 21, the two predetermined ranges A and B are set. Alternatively, three or more ranges may be set in correspondence with the integral value or the size of the range may be continuously varied in correspondence with the integral value.

In general, the panning photographing operation is also performed to continuously change principal objects, in addition to the tracking operation of the movement of an object, which has been discussed in the above embodiment. In this case, since a photographer cancels each previous registered object, that eventually falls outside the frame during the panning operation, the arrangement of this embodiment need not be adopted. At this time, the tracking operation may be stopped, and the registered contents may be cleared, or the tracking operation may be interrupted until the registered object appears in the frame again.

An image pickup apparatus according to the sixth embodiment will be described below. In the image pickup apparatus of this embodiment, when a no-finder photographing operation is started, the information of an object located at the center of the frame is registered to hold a principal object within the frame, and a tracking operation is automatically started, thus preventing the object from falling outside the frame especially at the large focal length side.

Figure 23:
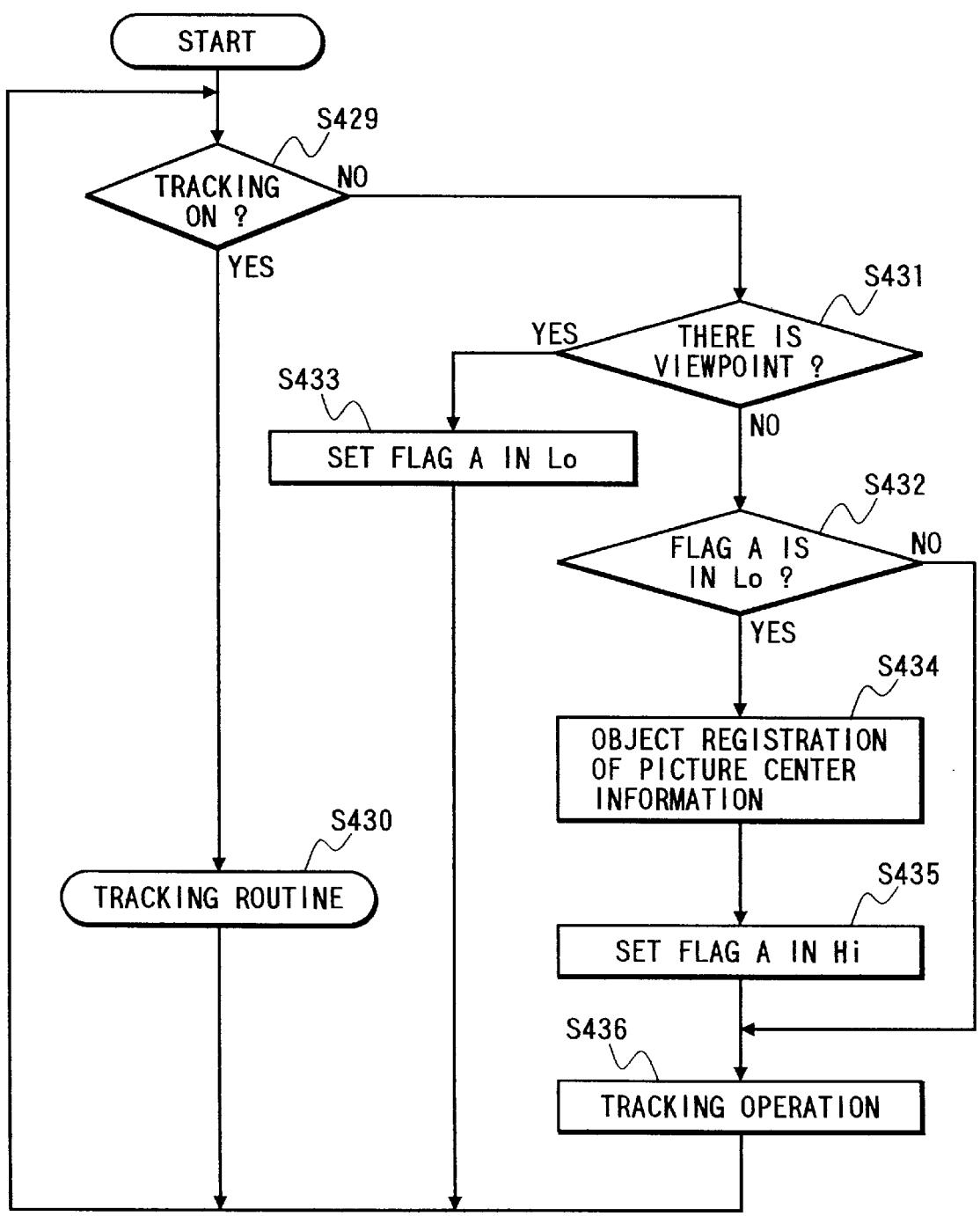
FIG. 23 is a flow chart showing the tracking processing routine in a no-finder photographing operation.

The microcomputer including the correction angle calculation circuit 418 performs the tracking operation in a no-finder photographing operation. FIG. 23 is a flow chart showing the tracking processing routine in the no-finder photographing operation. At the beginning of this routine, a flag A is "Lo". It is checked if the tracking operation is ON (step S429). If the tracking operation is OFF, it is checked via the viewpoint detection means if a photographer gazes at a point in the finder (step S431). If the photographer does not gaze at any point in the finder, it is checked if the flag A is "Hi" or "Lo" (step S432). If the flag A is "Lo", it is determined that the no-finder photographing operation has just begun, and the object information at the center of the frame at that time is registered as the feature of the object for the tracking operation (step S434).

After the registration, the flag A is set to be "Hi" (step S435). In step S434, the tracking operation is performed on the basis of the registered object information (step S436). Thereafter, the tracking operation continues based on the information registered in step S434 until the no-finder photographing operation ends. Upon completion of the no-finder photographing operation, YES is determined in step S431, and the flag A is set to be "Lo" (step S433). For this reason, when the no-finder photographing operation is started again, new object information is registered at that time.

On the other hand, if the tracking operation is ON, object information selected by a photographer is registered in the normal tracking routine (step S430).

In this embodiment, whether or not the no-finder photographing operation is performed is determined using the output from the viewpoint detection means. Alternatively, by using a simpler method, e.g., using a light-emitting element and a light-receiving element, a change in output from the light-receiving element caused by the photographer's face may be detected to discriminate the no-finder photographing operation.

An image pickup apparatus according to the seventh embodiment of the present invention will be described below. In the no-finder photographing operation described in the sixth embodiment, or even when a photographer gazes a point in the finder, a principal object may often fail to fall within the predetermined range for the tracking operation due to a large focal length of the photographing lens if only the optical axis correcting means is used or the clipping position is changed.

In the image pickup apparatus of the seventh embodiment, when an object to be tracked cannot be kept within the predetermined range even when a maximum optical axis correcting range is set, the signal extraction range for auto focus control (AF distance measurement frame) or the signal extraction range for auto exposure control (AE frame) is moved to the position of an object within the frame so as to attain an in-focus state or an optimal exposure state of the principal object.

When the principal object to be tracked falls outside the frame, the focal length of the photographing lens is moved to the wide-angle side to hold the principal object within the frame. When the focal length is already at the wide-angle end, since the principal object to be tracked can no longer be held within the frame, a certain warning message is generated.

Figure 24:
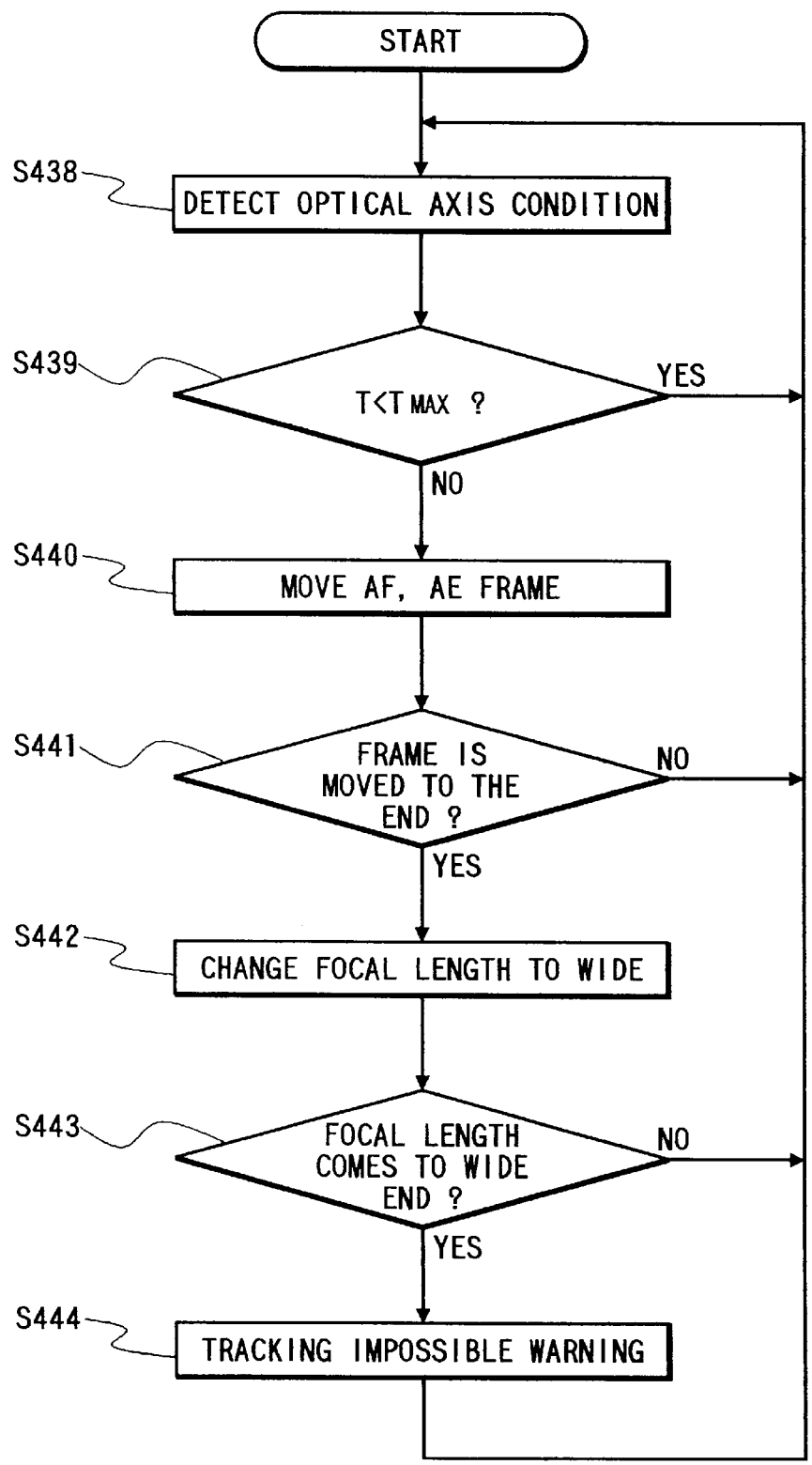
FIG. 24 is a flow chart showing the control processing routine for holding a principal object within a frame.

FIG. 24 is a flow chart showing the control processing routine for holding a principal object within the frame. After this routine is started, the condition of the optical axis to be located for the tracking operation is fetched (step S438). For example, when the optical axis is varied using the variable angle prism 420, the target angle state of the variable angle prism 420 is determined by the correction angle calculation circuit 418. If this angle is represented by T, the angle T is compared with the value of a maximum angle $T_{MAX}$ of the optical axis, which can be actually changed (step S439). If T is smaller than $T_{MAX}$, the variable angle prism 420 (or the lens group for varying the optical axis, or the electronic image clipping position) is varied to perform the tracking operation.

On the other hand, if T is equal to or larger than $T_{MAX}$, i.e., if the correction angle of the optical axis for the tracking operation exceeds the maximum correctable angle, the positions of the AF and AE frames are moved (step S440). Therefore, when a principal object cannot be held within the predetermined range at the center of the frame by correcting only the optical axis, the principal object is adjusted at least to an in-focus state and an optimal exposure state.

Furthermore, it is checked if the moved AF and AE frames have reached the end of the frame (step S441). If the AF and AE frames have reached the end of the frame, since the principal object may fall outside the frame, the focal length of the photographing lens is changed to the wide-angle side (step S442). It is then checked if the focal length has reached the wide-angle end (step S443). If the principal object is expected to fall outside the frame with high possibility, a certain warning message is generated (step S444).

As described above, this routine is controlled so as not to prevent the principal object (an object to be tracked) from falling outside the frame. Therefore, when the object cannot fall within the predetermined range at the center of the frame even when a maximum value (MAX) of optical axis correction is used, only the AE and AF frames are moved but the focal length may not be changed.

Once the AE and AF frames are moved, if T becomes smaller than $T_{MAX}$ thereafter, the AE and AF frames are fixed at the center again, and the tracking operation can be performed by correcting only the optical axis. Note that the warning means in step S444 may comprise visual means using, e.g., an LED, means using a warning sound, and means using a vibration.

Figure 25:
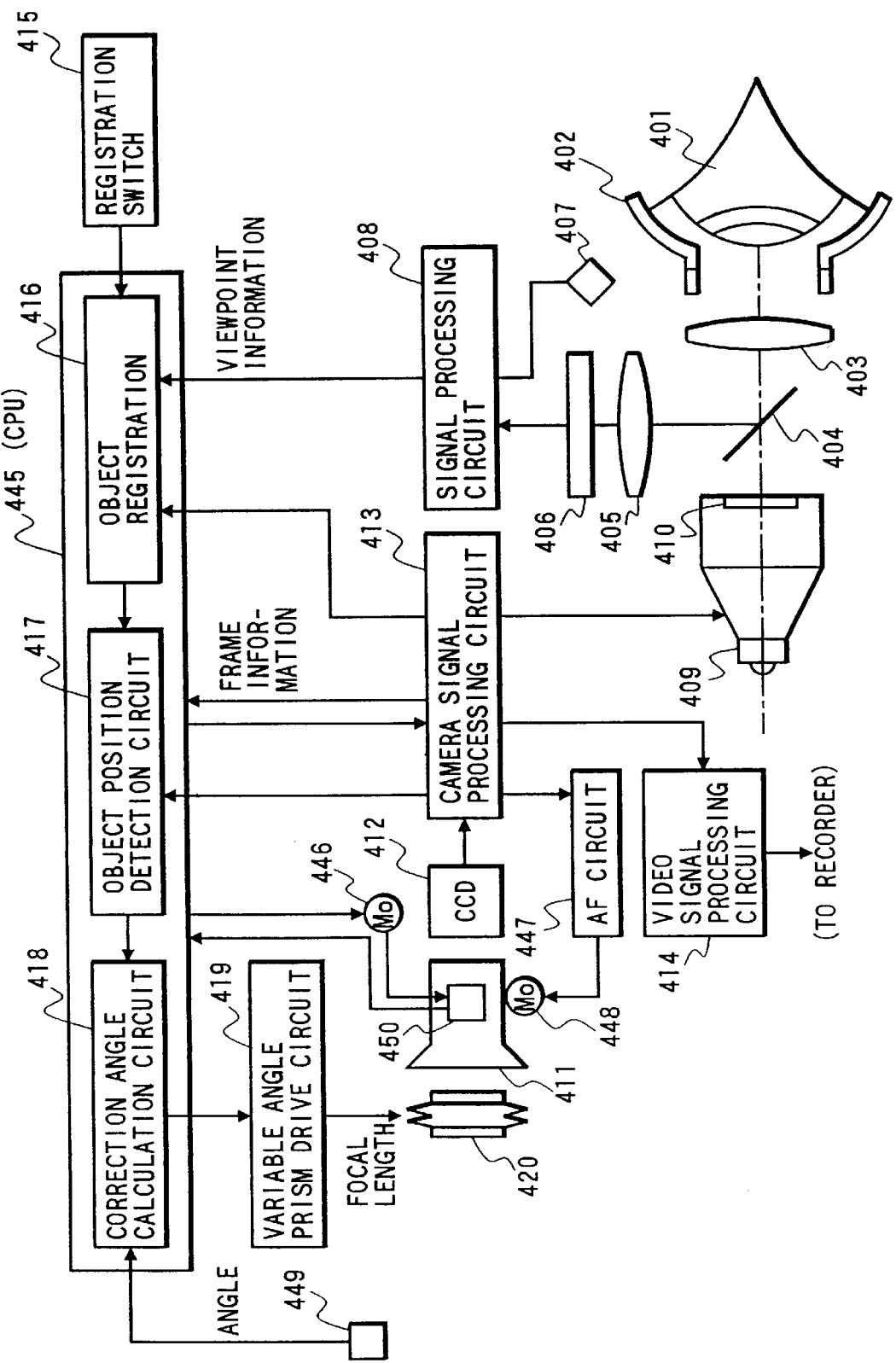
FIG. 25 is a block diagram showing the arrangement of an image pickup apparatus according to the eighth embodiment of the present invention.

FIG. 25 is a block diagram showing the arrangement of an image pickup apparatus according to the eighth embodiment. The image pickup apparatus of the eighth embodiment further comprises a variable angle prism detection circuit 449, a focal length detection circuit 450, a zoom motor 446, a focus motor 448, and an AF circuit 447 in addition to the arrangement of the image pickup apparatus of the first embodiment. The angle state of the variable angle prism 420, the position information of the AE and AF frames, and the focal length information of the photographing lens are supplied to a microcomputer (CPU) 445 including the blocks 416 to 418. The CPU 445 outputs not only the target angle state of the variable angle prism 420 but also the focal length and the frame positions.

According to the above-mentioned embodiments, the viewpoint is detected by the viewpoint detection means on the basis of the picked-up image of an object, and the feature of the object is detected by the feature detection means from a position including the detected viewpoint. The detected feature of the object is registered by the registration means, and the object is tracked by the tracking means on the basis of the registered feature. For this reason, since the feature of an object in the frame is initially registered by the viewpoint detection means, and the position of the object in the frame is controlled on the basis of the registered feature, the object can be accurately located at the required position in the frame.

According to the above-mentioned embodiments, since the feature of the object is registered upon depression of the registration switch, the viewpoint detection means need not always determine the viewpoint position as an object during a photographing operation when it recognizes the object, and an operation error which may occur when the viewpoint gazes at a point other than an object can be prevented.

According to the above-mentioned embodiments, since the tracking means comprises optical axis correcting means for changing the optical axis of an object to be photographed, the tracking operation can be attained by using the correction means for the motion prevention apparatus.

According to the above-mentioned embodiments, since the correction means of the motion prevention means controls the position, in the frame, of an object whose feature is registered, an image according to the object of a photographer can be obtained by controlling the position range, where the object is to be located, in the frame in correspondence with the motion detection result of the motion detection means. Also, in a photographing operation for photographing a moving object which is tracked by the panning to be kept located at the center of the frame, unnecessary motion components can be removed, and high-quality recording can be realized.

According to the above-mentioned embodiments, when the correction means of the motion prevention means also serves as the tracking means, the frequency of a drive command for the correction means is changed. For this reason, optimal control can be realized by varying the frequency bands of two signals when the correction means is controlled based on both the two pieces of position information in the frame for the motion prevention operation and the tracking operations.

According to the above-mentioned embodiments, since the size changing means changes the size of the position range, in the frame, of the registered object in correspondence with a motion of the object detected by the motion prevention means, the object can be held within the frame using the motion prevention means in the tracking photographing operation.

According to the above-mentioned embodiments, the detection means detects whether or not the viewpoint gazes at a point in the finder, and when it is detected that the viewpoint does not gaze at any point in the finder and a no-finder photographing operation is to be performed, the registration means registers the feature of an object at the center of the frame. For this reason, by detecting the execution of the no-finder photographing operation, and starting the tracking operation on the basis of information located at the center of the frame immediately before the no-finder photographing operation is started, an object can be held within the frame. In particular, in a hand-held no-finder photographing operation for a large focal length, an object can be held within the frame.

According to the above-mentioned embodiments, when the tracking means controls the position, in the frame, of the registered object using the correction means of the motion prevention means, and the object is located at the end of the correction range and can no longer be corrected, the signal extraction positions of auto focus control and auto exposure control are changed. For this reason, when an object can no longer be held at the center of the frame even using the correction means of the motion prevention means in the tracking photographing operation, the AE and AF frames are moved in correspondence with the position of the object in the frame, and when the frame positions have reached the end, the focal length of the photographing lens is changed to the wide-angle end side, thereby holding the object within the frame.

According to the above-mentioned embodiments, the viewpoint of the photographer is detected based on the picked-up image of an object, and the feature of the object is detected from a position including the detected viewpoint of the photographer. The detected feature of the object is registered, and the object is tracked on the basis of the registered feature. For this reason, since the feature of a principal object in the frame is initially registered by the viewpoint detection technique, and the position of the object in the frame is controlled on the basis of the registered feature, the object can be accurately located at a required position in the frame.

What is claimed is:

1. An image pickup apparatus comprising:

first detection means for detecting a movement of an object image in an image frame and outputting movement information;

tracking means for tracking the object image on the basis of the movement information of said object image detected by said first detection means;

second detection means for detecting a motion of the object image caused by a shake in said image frame; and control means for changing a frequency characteristics of said second detection means in the case that said tracking means is being operated.

2. An apparatus according to claim 1, wherein said control means controls said second detection means to perform a normal motion detection operation when said tracking means is not active, and said control means changes frequency characteristics of motion detection characteristics of said second detection means when said tracking means is active.

3. An apparatus according to claim 2, wherein said control means shifts the frequency characteristics of the motion detection characteristics of said second detection means toward a high-frequency side when said tracking means is active.

4. An apparatus according to claim 1, wherein said tracking means comprises a VAP, and said control means drives said VAP on the basis of an output from said second detection means.

5. An apparatus according to claim 1, wherein said second detection means extracts a feature of the object image from image frame signals, and detects movement, of the feature from said image frame signals.

6. An image pickup apparatus comprising:

first detection means for detecting a movement of an object image in an image frame;

second detection means for detecting a motion of the object image caused by shake in said image frame; and tracking means for tracking the object image responsively to output signals of said first detection means and for changing a frequency characteristic of said second detection means during tracking the object.

7. An apparatus according to claim 6, further comprising control means for controlling said second detection means to perform a normal motion detection operation when said tracking means is not active, and said control means changes frequency characteristics of motion detection characteristics of said second detection means when said tracking means is active.

8. An apparatus according to claim 7, wherein said control means shifts the frequency characteristics of the motion detection characteristics of said second detection means toward a high-frequency side when said tracking means is active.

9. An apparatus according to claim 7, wherein said tracking means comprises a VAP, and said control means drives said VAP on the basis of an output from said second detection means.

10. An apparatus according to claim 9, wherein said motion detection means extracts a feature of the object from the image, and detects movement of the feature in the frame.

11. An image pickup apparatus comprising:

tracking means for tracking an object on the basis of the movement information of the object;

shake correcting means including detection means for detecting a shake and correcting means for correcting a movement of an object image on the basis of an output of said detection means; and control means for changing a frequency characteristics of said shake correcting means in the case that said tracking means is being operated.

12. An apparatus according to claim 11, wherein said control means controls said detection means to perform a normal motion detection operation when said tracking means is not active, and said control means changes frequency characteristics of motion detection characteristics of said detection means when said tracking means is active.

13. An apparatus according to claim 12, wherein said control means shifts the frequency characteristics of the motion detection characteristics of said detection means toward a high-frequency side when said tracking means is active.

14. An apparatus according to claim 11, wherein said tracking means comprises a VAP, and said control means drives said VAP on the basis of the output from said detection means.

15. An apparatus according to claim 11, wherein said detection means extracts a feature of the object from an image signal and detects movement of the feature in a frame.

16. A tracking control method comprising:

first detection step of detecting a movement of an object image in an image frame and outputting movement information;

tracking step of tracking the object image on the basis of the movement information of said object image detected by said first detection step;

second detection step of detecting a motion of the object image caused by a shake in said image frame; and control step of changing a frequency characteristic of said second detection step in the case that said tracking step is being executed.

17. A method according to claim 16, wherein said control step controls said second detection step to perform a normal motion detection operation when said tracking step is not operative, and said control step changes frequency characteristics of motion detection characteristics of said second detection step when said tracking step is executed.

18. A method according to claim 17, wherein said control step shifts the frequency characteristics of the motion detection characteristics of said second detection step toward a high-frequency side when said tracking step is executed.

19. A method according to claim 16, wherein said control step drives a VAP on the basis of an output from said second detection step.

20. A method according to claim 16, wherein said second detection step extracts a feature of the object image from image frame signals, and detects movement of the feature from said image frame signals.

21. A tracking control method comprising:

first detection step of detecting a movement of an object image in an image frame;

second detection step of detecting a motion of the object image caused by shake in said image frame; and tracking step of tracking the object image responsively to output signals of a process of said first detection step and for changing a frequency characteristic of said second detection step during tracking the object.

22. A method according to claim 21, further comprising control step for controlling a process of said second detection step to perform a normal motion detection operation when said tracking step is not active, and said control step changes frequency characteristics of motion detection characteristics of said second detection step when said tracking step is executed.

23. A method according to claim 22, wherein said control step shifts the frequency characteristics of the motion detection characteristics of said second detection step toward a high-frequency side when said tracking step is executed.

24. A method according to claim 22, wherein said control step drives a VAP on the basis of an output from said second detection step.

25. A tracking method comprising:

tracking step of tracking an object on the basis of the movement information of the object;

shake correcting step of including detection step of detecting a shake and correcting step of correcting a movement of an object image on the basis of an output of said detection step; and control step of changing a frequency characteristic of said shake correction step in the case that said tracking step is being executed.

26. A method according to claim 25, wherein said control step controls said detection step to perform a normal motion detection operation when said tracking step is not active, and said control step changes frequency characteristics of motion detection characteristics of said detection step when said tracking step is executed.

27. A method according to claim 26, wherein said control step shifts the frequency characteristics of the motion detection characteristics of said detection step toward a high-frequency side when said tracking step is executed.

* * * * *

UNITED STATES PATENT AND TRADEMARK OFFICE
CERTIFICATE OF CORRECTION

PATENT NO.    : 6,072,525
DATED         : June 6, 2000
INVENTOR(S)   : Naoya Kaneda It is certified that error appears in the above-identified patent and that said Letters Patent is hereby corrected as shown below:

Title page,
Line [75], delete "Chigasaki," and insert -- Kanagawa-ken , --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*